United States Patent
Sawada et al.

(10) Patent No.: US 11,603,434 B2
(45) Date of Patent: Mar. 14, 2023

(54) METHOD FOR MANUFACTURING THERMOPLASTIC RESIN COMPOSITION

(71) Applicant: Kao Corporation, Tokyo (JP)

(72) Inventors: Hiroki Sawada, Wakayama (JP); Tadanori Yoshimura, Wakayama (JP); Tomoya Tsuboi, Sakai (JP); Jouji Hirai, Wakayama (JP); Akihiro Onoue, Wakayama (JP)

(73) Assignee: Kao Corporation, Tokyo (JP)

( * ) Notice: Subject to any disclaimer, the term of this patent is extended or adjusted under 35 U.S.C. 154(b) by 346 days.

(21) Appl. No.: 16/630,787

(22) PCT Filed: Jul. 13, 2018

(86) PCT No.: PCT/JP2018/026458
§ 371 (c)(1),
(2) Date: Jan. 13, 2020

(87) PCT Pub. No.: WO2019/013317
PCT Pub. Date: Jan. 17, 2019

(65) Prior Publication Data
US 2021/0087341 A1    Mar. 25, 2021

(30) Foreign Application Priority Data
Jul. 14, 2017  (JP) .............. JP2017-137801

(51) Int. Cl.
*C08G 75/24* (2006.01)
*B33Y 10/00* (2015.01)
(Continued)

(52) U.S. Cl.
CPC ............ *C08G 75/24* (2013.01); *B29C 64/118* (2017.08); *B29C 64/40* (2017.08); *B33Y 10/00* (2014.12);
(Continued)

(58) Field of Classification Search
CPC ....... C08G 75/24; B29C 64/40; C09D 11/104; B29K 2081/06; B29K 2101/12; B33Y 70/00
See application file for complete search history.

(56) References Cited

U.S. PATENT DOCUMENTS 6,579,466 B1    6/2003  David et al.
2017/0037220 A1*  2/2017  Tani .................. C08K 5/49
(Continued)

FOREIGN PATENT DOCUMENTS

CN    105992688 A    10/2016
JP    S57-124729 A    8/1982
(Continued)

OTHER PUBLICATIONS

English translation of JP-02209950-A by EPO (abstract and specification). (Year: 1990).*

(Continued)

*Primary Examiner* — Leith S Shafi
*Assistant Examiner* — Inja Song
(74) *Attorney, Agent, or Firm* — Element IP, PLC

(57) ABSTRACT

A method for manufacturing a thermoplastic resin composition enabling easy control of the weight average molecular weight of a thermoplastic resin used in a soluble three-dimensional modeling support material, the support material having sufficient strength even when used in the manufacture of a three-dimensional object by an FDM system 3D printer, being less colored with excellent appearance quality, and having a high dissolution speed in neutral water and quickly removable from a precursor of the three-dimensional object without using a strong alkaline aqueous solution; and the thermoplastic resin having dicarboxylic acid monomer units derived from a dicarboxylic acid component and having a proportion of an aromatic dicarboxylic acid (Continued)

monomer unit derived from a sulfonic acid group and/or sulfonate group-containing aromatic dicarboxylic acid component in the dicarboxylic acid monomer units of 10 mol % or more; the method including mixing an organic salt compound represented by formula (I):

$$(R^1-SO_3^-)_n X^{n+} \qquad (I).$$

12 Claims, 4 Drawing Sheets

(51) Int. Cl.
    *B33Y 70/00* (2020.01)
    *B29C 64/118* (2017.01)
    *B29C 64/40* (2017.01)
    *C09D 11/104* (2014.01)
    *B29K 81/00* (2006.01)
    *B29K 101/12* (2006.01)

(52) U.S. Cl.
    CPC .......... *B33Y 70/00* (2014.12); *C09D 11/104* (2013.01); *B29K 2081/06* (2013.01); *B29K 2101/12* (2013.01)

(56) References Cited

U.S. PATENT DOCUMENTS

| | | | |
|---|---|---|---|
| 2017/0232684 A1 | 8/2017 | Yoshimura et al. | |
| 2018/0009160 A1 | 1/2018 | Sawada et al. | |
| 2018/0030234 A1* | 2/2018 | Priedeman, Jr. ... | G03G 15/1625 |
| 2018/0312689 A1* | 11/2018 | Kato ................... | C08G 64/06 |

FOREIGN PATENT DOCUMENTS

| | | | |
|---|---|---|---|
| JP | 2-209950 A | | 8/1990 |
| JP | 02209950 A | * | 8/1990 |
| JP | H07-41552 A | | 2/1995 |
| JP | 9-506139 A | | 6/1997 |
| JP | 2002-516346 A | | 6/2002 |
| JP | 2003003058 A | | 1/2003 |
| JP | 2003034748 A | | 2/2003 |
| JP | 2004161980 A | * | 6/2004 |
| JP | 2006-22232 A | | 1/2006 |
| JP | 2008-507619 A | | 3/2008 |
| JP | 2017-30346 A | | 2/2017 |
| WO | WO 99/60507 A1 | | 11/1999 |
| WO | WO 2006/020279 A2 | | 2/2006 |
| WO | WO-2016125860 A1 | | 8/2016 |
| WO | WO-2016205690 A1 | | 12/2016 |
| WO | WO-2017022637 A1 | | 2/2017 |

OTHER PUBLICATIONS

English translation of JP-2004161980-A by EPO (abstract and specification) (Year: 2004).*
English translation of the international Preliminary Report on Patentability and Written Opinion of the international Searching Authority for Application No. PCT/JP2018/026458, dated Jan. 23, 2020.
Extended European Search Report dated Dec. 4, 2020 in Application No. 18832505.4, 6 pages.
International Search Report for PCT/JP2018/026458 (PCT/ISA/210) dated Aug. 21, 2018.
English translation of Search Report dated Sep. 1, 2021 in Chinese Patent Application No. 201880046549.0, 1 page.
English translation of Search Report dated Apr. 20, 2022 in Chinese Patent Application No. 201880046549.0, 1 page.

* cited by examiner

[fig.1]
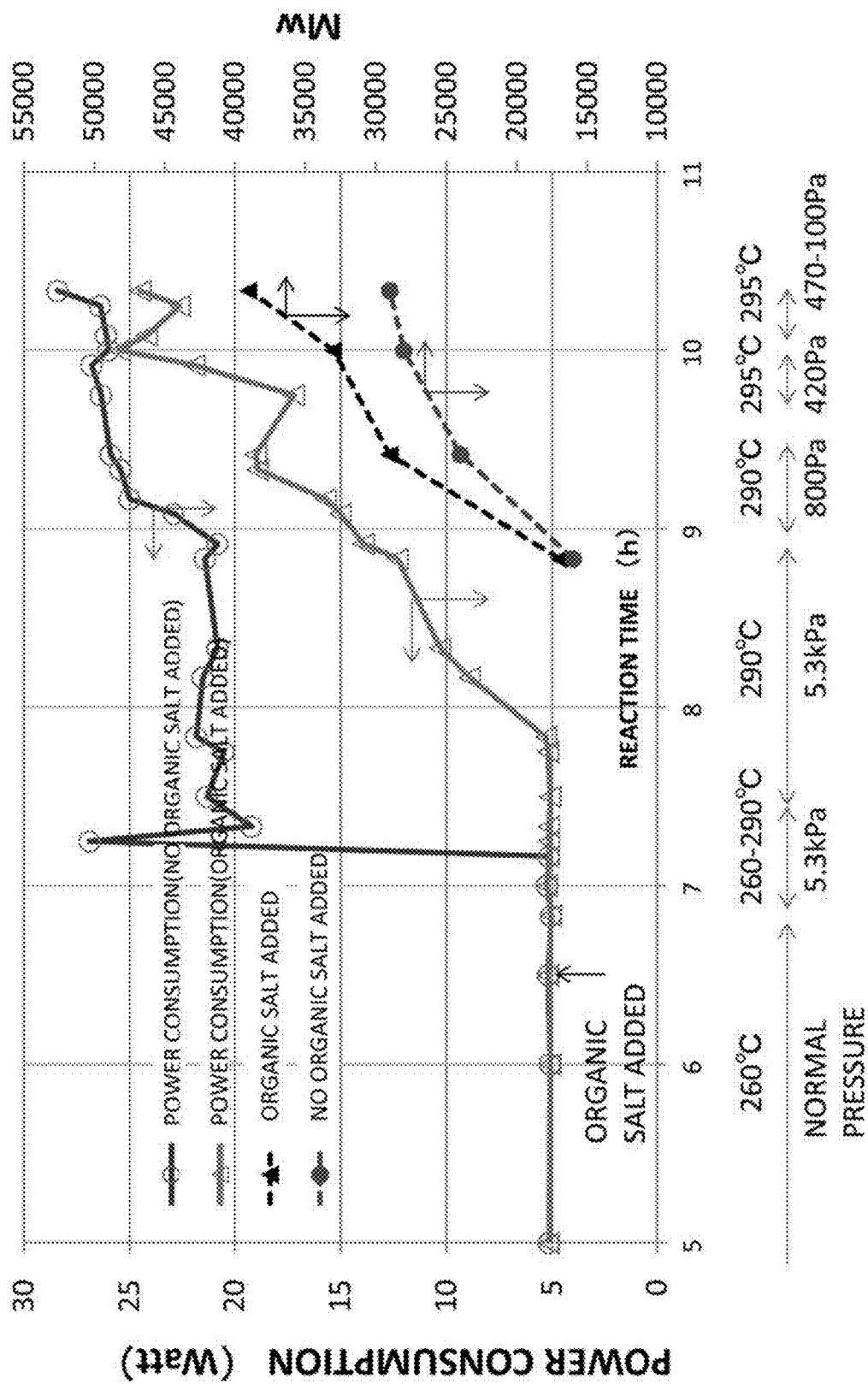

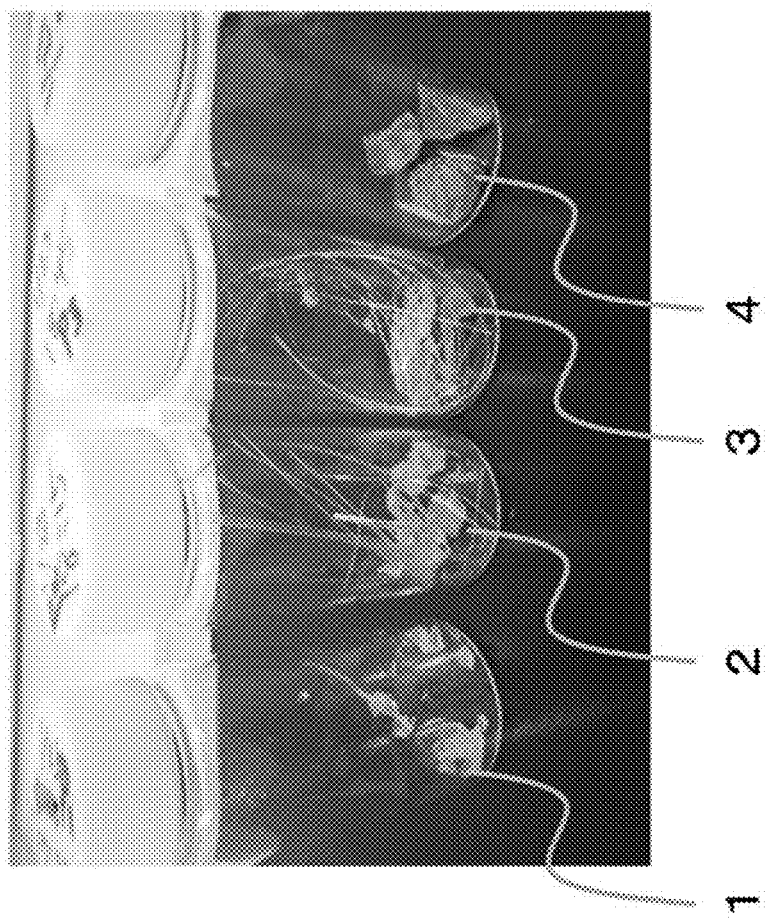
[fig.2]

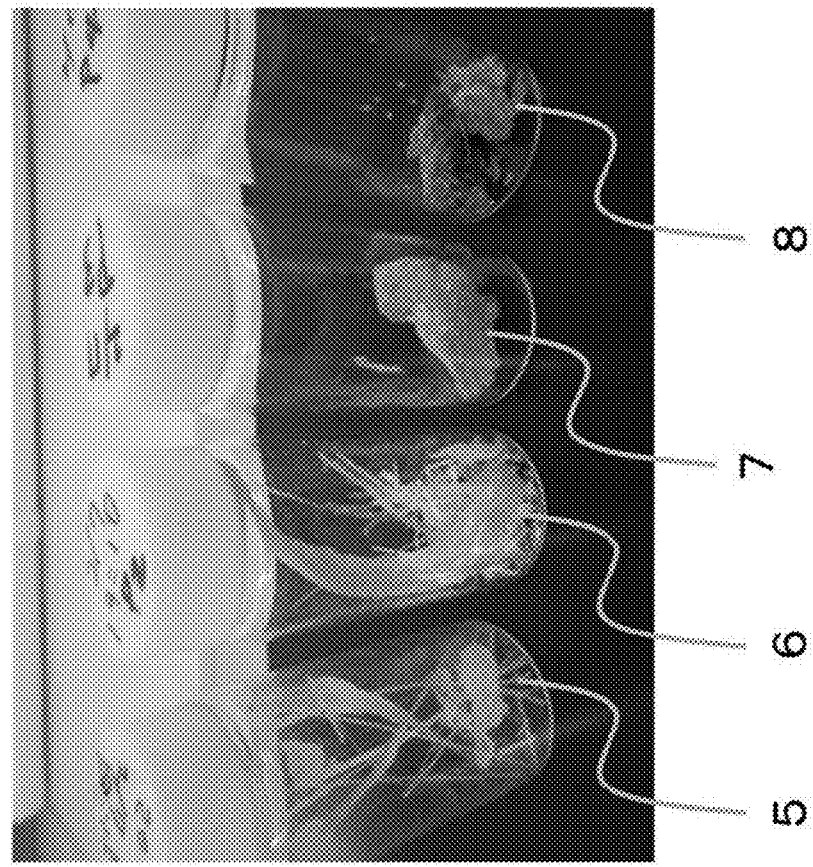
[fig.3]

[fig.4]
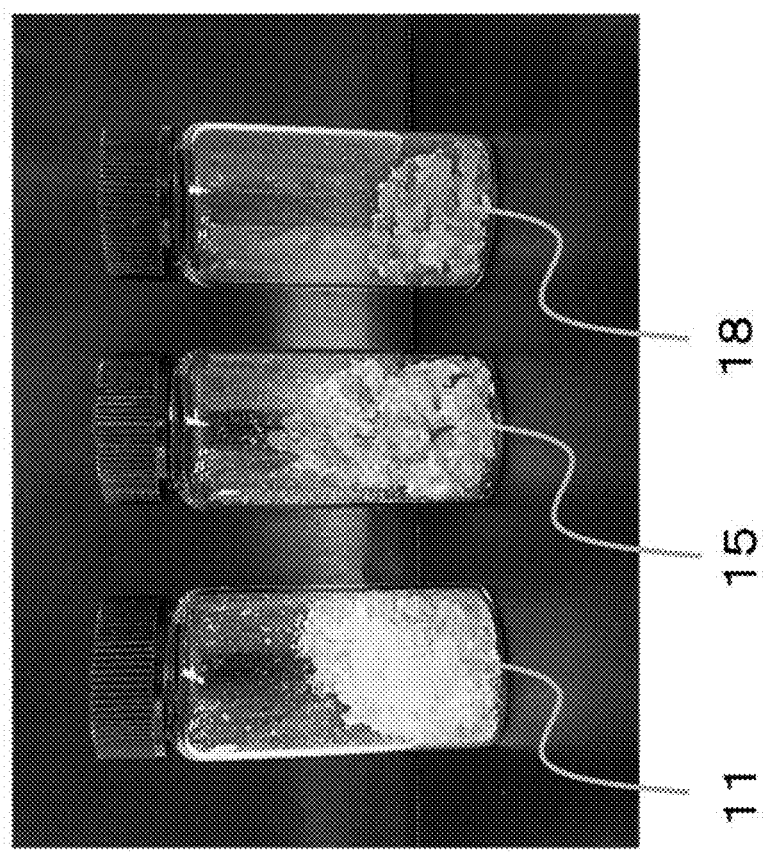

METHOD FOR MANUFACTURING THERMOPLASTIC RESIN COMPOSITION

TECHNICAL FIELD

The present invention relates to a method for manufacturing a thermoplastic resin composition.

BACKGROUND ART

The 3D printer is one type of rapid prototyping, and it is a three-dimensional printer for modeling a three-dimensional object based on 3D data such as 3D CAD and 3D CG. Systems of 3D printing have been known, such as a fused deposition modeling system (hereinafter referred to as an FDM system), an inkjet ultraviolet curing system, a stereolithography system, and a selective laser sintering system. Among these systems, the FDM system is a modeling system of heat-melting, extruding, and laminating polymer filaments to obtain a three-dimensional object, and the FDM system does not use a reaction of the material unlike other systems. Accordingly, a 3D printer of an FDM system is small and inexpensive, and has become popular in recent years as an apparatus with less post-processing. In order to model a three-dimensional object having a more complex shape in a FDM system, a modeling material constituting the three-dimensional object and a support material for supporting a three-dimensional structure of the modeling material are laminated to obtain a precursor of the three-dimensional object, and then the support material is removed from the precursor of the three-dimensional object to obtain the target three-dimensional object.

An example of the method of removing the support material from the precursor of the three-dimensional object is a method of using a methacrylic acid copolymer as the support material and soaking the precursor of the three-dimensional object in a strong alkaline solution to remove the support material (for example, JP-T-2008-507619). The method utilizes that carboxylic acid in the methacrylic acid copolymer is neutralized by an alkali and dissolved in an aqueous strong alkaline solution.

In the case of using, as a support material, the methacrylic acid copolymer disclosed in the document JP-A-2008-507619, an aqueous strong alkaline solution needs to be used to remove the support material from a precursor of a three-dimensional object. However, this aqueous strong alkaline solution is large in danger for people and in load onto the environment. Moreover, when a precursor of the three-dimensional object is immersed in the aqueous strong alkaline solution for a long term, the three-dimensional object in the precursor of the three-dimensional object tends to be eroded by the alkali. Thus, restrictions have been given to the use of any polyester resin, such as polylactic acid (PLA), which is low in resistance against alkalines, as a raw material of the three-dimensional object. Thus, support materials have been required which are removable not by any aqueous strong alkaline solution but by a neutral water having a pH of 6 to 8.

Against this problem, the document JP-A-2002-516346 discloses a method of using poly(2-ethyl-2-oxazoline), which is soluble in water, as a support material, and immersing a precursor of a three-dimensional object in water, so as to remove the support material therein. According to the method described in this document JP-A-2002-516346, the support material in the precursor of the three-dimensional object can be removed without using any aqueous strong alkaline solution. However, poly(2-ethyl-2-oxazoline), which is contained in the soluble material for three-dimensional modeling, is high in affinity with water. Thus, when the soluble material for three-dimensional modeling, which contains poly(2-ethyl-2-oxazoline), is exposed to a high humidity, this polymer absorbs water in the air. When the soluble material for three-dimensional modeling, which contains poly(2-ethyl-2-oxazoline) containing the water and further contains others, is heated, melted, printed out and laminated, using a 3D printer of an FDM system, the water is vaporized and scattered by high temperature so that the soluble material is foamed. Consequently, the precision (In the present specification, dimensional precision is also referred to simply as "precision") of the resultant three-dimensional object is remarkably damaged.

In order to solve the above problems, the inventors of the present invention have filed a patent application (JP-A-2017-30346) for an invention of a soluble material for three-dimensional modeling that is used for a support material and that is suitable for the manufacturing of a three-dimensional object by an FDM system, has moisture absorption resistance, and has a high rate of dissolution to neutral water to be removable speedily from a precursor of the three-dimensional object without use of a strong alkaline aqueous solution.

SUMMARY OF THE INVENTION

A method for manufacturing a thermoplastic resin composition according to the present invention is a method for manufacturing a thermoplastic resin composition containing a thermoplastic resin that has dicarboxylic acid monomer units derived from a dicarboxylic acid component and that has a proportion of an aromatic dicarboxylic acid monomer unit derived from a sulfonic acid group and/or sulfonate group-containing aromatic dicarboxylic acid component in the dicarboxylic acid monomer units of 10 mol % or more, the method including mixing an organic salt compound represented by a following general formula (I).

$$(R^1-SO_3^-)_n X^{n+} \quad (I)$$

(wherein $R^1$ represents a hydrocarbon group that may have a substituent and has 1 to 30 carbon atoms, n represents a number of 1 or 2, and when n is 1, $X^{n+}$ represents a sodium ion, a potassium ion, a lithium ion, an ammonium ion, or a phosphonium ion, and when n is 2, $X^{n+}$ represents a magnesium ion, a calcium ion, a barium ion, or a zinc ion.)

BRIEF DESCRIPTION OF THE DRAWINGS

FIG. 1 is a graph on which power consumption by a stirrer and weight average molecular weight of samples were plotted.

FIG. 2 is a photograph showing hues of evaluation samples in examples.

FIG. 3 is a photograph showing hues of evaluation samples in comparative examples.

FIG. 4 is a photograph showing hues of evaluation samples of examples and a comparative example.

MODE FOR CARRYING OUT THE INVENTION

When a thermoplastic resin such as a polyester resin or a polyamide resin is used as a material of a soluble material for three-dimensional modeling, the thermoplastic resin preferably has a certain weight average molecular weight or more for exertion of strength such as toughness required of the soluble material for three-dimensional modeling. The thermoplastic resin having a high weight average molecular weight, however, comparatively decreases the dissolution speed in neutral water to show a tendency of making it difficult to quickly remove a support material from a precursor of a three-dimensional object. That is, it is important to control the weight average molecular weight of the thermoplastic resin used as a material of the soluble material for three-dimensional modeling during manufacture of the thermoplastic resin. Further, a thermoplastic resin composition having high solubility in neutral water has been required also when the molecular weight of the thermoplastic resin is further increased from a viewpoint of attaining high performance.

As a method for controlling the weight average molecular weight of the thermoplastic resin during the manufacture, considered is a method for managing the weight average molecular weight, using stirring torque as an index. Rapid thickening, however, occurs along with progress of condensation polymerization to make uniform stirring difficult even with high stirring power and thus not to allow discovery of a correlationship between the stirring torque and the weight average molecular weight, making it difficult to manage the weight average molecular weight by this method. Further, as a result of ununiform stirring, it becomes impossible to smoothly remove a side product from the system, also presenting a problem of making it difficult to attain an increase of a certain weight average molecular weight or more. In order to avoid these problems, considered is a method for lowering the viscosity of the thermoplastic resin by increasing the reaction temperature, but the method causes thermal degradation of a product and is thus not preferable.

Considered as another method for controlling the weight average molecular weight of the thermoplastic resin during the manufacture is a method for performing a condensation reaction at a low temperature while appropriately sampling the thermoplastic resin to measure the weight average molecular weight of the thermoplastic resin. This method, however, is not practical for high costs.

Further, the polyester resin and the polyamide resin as the thermoplastic resins sometimes cause coloring during the manufacture. This coloring occurs due to kneading at a high temperature or a long-time thermal history and irreversibly progresses from yellow to brown. It is difficult to recover the polyester resin and the polyamide resin that have been once colored, by, for example, filtration, decoloring, or purification, and the coloring is not preferable in terms of appearance and quality of a manufactured product as a 3D printer support material. Further, in order to improve the removability of the support material from a precursor of a three-dimensional object, the support material is sometimes intentionally colored for enabling easy discrimination of the support material from a modeling material by visual inspection. The coloring during the manufacture of the thermoplastic resin, however, does not allow the soluble material for three-dimensional modeling containing the thermoplastic resin to be selectively colored and is thus not preferable also in this respect.

The present invention provides a method for manufacturing a thermoplastic resin composition that enables easy control of the weight average molecular weight of a thermoplastic resin and that is used as a material of a soluble material for three-dimensional modeling to be a support material, the support material having sufficient strength even when used in manufacture of a three-dimensional object by an FDM system 3D printer, having a high dissolution speed in neutral water to be quickly removable from a precursor of the three-dimensional object without use of a strong alkaline aqueous solution, and being less colored to have excellent appearance quality.

A method for manufacturing a thermoplastic resin composition according to the present invention is a method for manufacturing a thermoplastic resin composition containing a thermoplastic resin that has dicarboxylic acid monomer units derived from a dicarboxylic acid component and that has a proportion of an aromatic dicarboxylic acid monomer unit derived from a sulfonic acid group and/or sulfonate group-containing aromatic dicarboxylic acid component in the dicarboxylic acid monomer units of 10 mol % or more, the method including mixing an organic salt compound represented by a following general formula (I).

$(R^1\text{—}SO_3^-)_n X^{n+}$          (I)

(wherein $R^1$ represents a hydrocarbon group that may have a substituent and has 1 to 30 carbon atoms, n represents a number of 1 or 2, and when n is 1, $X^{n+}$ represents a sodium ion, a potassium ion, a lithium ion, an ammonium ion, or a phosphonium ion, and when n is 2, $X^{n+}$ represents a magnesium ion, a calcium ion, a barium ion, or a zinc ion.)

The present invention is capable of providing the method for manufacturing a thermoplastic resin composition that enables easy control of the weight average molecular weight of a thermoplastic resin and that is used as a material of a soluble material for three-dimensional modeling to be a support material, the support material having sufficient strength even when used in manufacture of a three-dimensional object by an FDM system 3D printer, having a high dissolution speed in neutral water to be quickly removable from a precursor of the three-dimensional object without use of a strong alkaline aqueous solution, and being less colored to have excellent appearance quality.

Hereinafter, one embodiment of the present invention is described.

<Method for Manufacturing Thermoplastic Resin Composition>

A method for manufacturing a thermoplastic resin composition according to the present embodiment is a method for manufacturing a thermoplastic resin composition containing a thermoplastic resin that has dicarboxylic acid monomer units derived from a dicarboxylic acid component and that has a proportion of an aromatic dicarboxylic acid monomer unit derived from a sulfonic acid group and/or sulfonate group-containing aromatic dicarboxylic acid component in the dicarboxylic acid monomer units of 10 mol % or more, the method including mixing an organic salt compound represented by a following general formula (I).

$(R^1\text{—}SO_3^-)_n X^{n+}$          (I)

(wherein $R^1$ represents a hydrocarbon group that may have a substituent and has 1 to 30 carbon atoms, n represents a number of 1 or 2, and when n is 1, $X^{n+}$ represents a sodium ion, a potassium ion, a lithium ion, an ammonium ion, or a phosphonium ion, and when n is 2, $X^{n+}$ represents a magnesium ion, a calcium ion, a barium ion, or a zinc ion.)

The method for manufacturing a thermoplastic resin composition according to the present embodiment is capable of providing a thermoplastic resin composition that enables easy control of the weight average molecular weight of a thermoplastic resin and that is used as a material of a soluble material for three-dimensional modeling to be a support material, the support material having sufficient strength even when used in manufacture of a three-dimensional object by an FDM system 3D printer, having a high dissolution speed in neutral water to be quickly removable from a precursor of the three-dimensional object without use of a strong alkaline aqueous solution, and being less colored to have excellent appearance quality.

[Thermoplastic Resin]

The thermoplastic resin has dicarboxylic acid monomer units derived from a dicarboxylic acid component. The dicarboxylic acid monomer units contain an aromatic dicarboxylic acid monomer unit derived from a sulfonic acid group and/or sulfonate group-containing aromatic dicarboxylic acid component, from a viewpoint of solubility in neutral water that is not a strong alkaline aqueous solution and has a pH of 6 to 8. Hereinafter, in the present specification, the dicarboxylic acid monomer units derived from the dicarboxylic acid component are referred to as dicarboxylic acid monomer unit A, and the dicarboxylic acid component for deriving the dicarboxylic acid monomer unit A is referred to as a dicarboxylic acid component A. Meanwhile, the aromatic dicarboxylic acid monomer unit contained in the monomer unit A and derived from the sulfonic acid group and/or sulfonate group-containing aromatic dicarboxylic acid component is referred to as a dicarboxylic acid monomer unit a, and the aromatic dicarboxylic acid component for deriving the dicarboxylic acid monomer unit a is referred to as an aromatic dicarboxylic acid component a.

[Dicarboxylic Acid Monomer Unit A]

(Dicarboxylic Acid Monomer Unit a)

From a viewpoint of the solubility into neutral water and a viewpoint of the easiness of the polymerization when producing the thermoplastic resin, the sulfonate group is preferably a sulfonate group represented by $-SO_3M^3$ ($M^3$ represents a counterion of a sulfonic acid group constituting the sulfonate group; and from a viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

The aromatic dicarboxylic acid component a is at least one type selected from the group consisting of a sulfonic acid group-containing aromatic dicarboxylic acid and a sulfonate group-containing aromatic dicarboxylic acid. The aromatic dicarboxylic acid component a is preferably at least one type selected from the group consisting of 5-sulfoisophthalic acid, 2-sulfoterephthalic acid, and 4-sulfo-2,6-naphthalene dicarboxylic acid, more preferably at least one type selected from the group consisting of 5-sulfoisophthalic acid and 2-sulfoterephthalic acid, and further preferably 5-sulfoisophthalic acid, from the viewpoint of solubility in neutral water, a viewpoint of moisture absorption resistance, a viewpoint of heat resistance required for modeling by a 3D printer, and a viewpoint of an easy polymerization reaction during manufacture of the thermoplastic resin.

The dicarboxylic acid monomer unit A have a proportion of the dicarboxylic acid monomer unit a of 10 mol % or more, preferably 16 mol % or more, more preferably 20 mol % or more, further preferably 23 mol % or more, from the viewpoint of solubility in neutral water, and have a proportion of preferably 90 mol % or less, more preferably 80 mol % or less, further preferably 70 mol % or less, further more preferably 65 mol % or less, from the viewpoint of moisture absorption resistance and the viewpoint of heat resistance required for modeling by a 3D printer. Further, the dicarboxylic acid monomer unit A has a proportion of the dicarboxylic acid monomer unit a of preferably 10 to 90 mol %, more preferably 16 to 80 mol %, further preferably 20 to 70 mol %, further more preferably 23 to 65 mol %, from the viewpoint of solubility in neutral water, the viewpoint of moisture absorption resistance, the viewpoint of heat resistance required for modeling by a 3D printer, and the viewpoint of an easy polymerization reaction during manufacture of the thermoplastic resin.

From a viewpoint of the solubility into neutral water, a total content of the sulfonic acid group and the sulfonate group in the thermoplastic resin is preferably 0.5 mmol/g or more, more preferably 0.6 mmol/g or more, and further preferably 0.7 mmol/g or more; and from a viewpoint of moisture absorption resistance, it is preferably 3.0 mmol/g or less, more preferably 1.5 mmol/g or less, and further preferably 1.0 mmol/g or less. From the viewpoint of the solubility into neutral water and the viewpoint of moisture absorption resistance, the total content of the sulfonic acid group and the sulfonate group in the thermoplastic resin is preferably 0.5 mmol/g to 3.0 mmol/g, more preferably 0.6 mmol/g to 1.5 mmol/g, and further preferably 0.7 mmol/g to 1.0 mmol/g.

A dicarboxylic acid monomer unit A other than the dicarboxylic acid monomer unit a is not particularly limited, but is preferably a dicarboxylic acid monomer unit derived from a non-hydrophilic group-containing dicarboxylic acid component, from the viewpoint of moisture absorption resistance and the viewpoint of heat resistance required for modeling by a 3D printer. Hereinafter, in the present specification, the dicarboxylic acid monomer unit derived from the non-hydrophilic group-containing dicarboxylic acid component is referred to as a dicarboxylic acid monomer unit B, and the dicarboxylic acid component for deriving the dicarboxylic acid monomer unit B is referred to as a dicarboxylic acid component B.

Examples of the hydrophilic group include a primary amino group, a secondary amino group, a tertiary amino group, a quaternary ammonium salt group, an oxyethylene group, a hydroxyl group, a carboxyl group, a carboxylate group, a phosphoric acid group, and a phosphate group.

The dicarboxylic acid B is not particularly limited as long as it is a non-hydrophilic group-containing dicarboxylic acid. However, from the viewpoint of moisture absorption resistance, the viewpoint of heat resistance required for modeling by a 3D printer, and the viewpoint of an easy polymerization reaction during manufacture of the polyester resin, the dicarboxylic acid B is preferably at least one type selected from the group consisting of aromatic dicarboxylic acid, aliphatic dicarboxylic acid, and alicyclic dicarboxylic acid. Among these, from the same viewpoints, at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid are more preferable; and at least one type selected from the group consisting of terephthalic acid, 2,5-furan dicarboxylic acid, and 2,6-naphthalene dicarboxylic acid are further preferable; and 2,6-naphthalene dicarboxylic acid are further more preferable.

The thermoplastic resin has a proportion of the amount of the dicarboxylic acid monomer unit a to the total amount of all monomer units of preferably 5 mol % or more, more preferably 8 mol % or more, further preferably 10 mol % or more, and preferably 45 mol % or less, more preferably 35 mol % or less, further preferably 30 mol % or less, from the viewpoint of solubility in neutral water, the viewpoint of moisture absorption resistance, the viewpoint of heat resistance required for modeling by a 3D printer, and the viewpoint of an easy polymerization reaction during manufacture of the thermoplastic resin. Further, the thermoplastic resin has a proportion of the amount of the dicarboxylic acid monomer unit a to the total amount of all monomer units of preferably 5 to 45 mol %, more preferably 8 to 40 mol %, further preferably 10 to 35 mol %, from the viewpoint of solubility in neutral water, the viewpoint of moisture absorption resistance, the viewpoint of heat resistance required for modeling by a 3D printer, and the viewpoint of an easy polymerization reaction during manufacture of the thermoplastic resin.

The thermoplastic resin has a proportion of the amount of the dicarboxylic acid monomer unit B to the total amount of all monomer units of preferably 5 mol % or more, more preferably 15 mol % or more, further preferably 20 mol % or more, from the viewpoint of moisture absorption resistance, and has a proportion of preferably 45 mol % or less, more preferably 42 mol % or less, further preferably 40 mol % or less, from the viewpoint of solubility in neutral water. Further, the thermoplastic resin has a proportion of the amount of the dicarboxylic acid monomer unit B to the total amount of all monomer units of preferably 5 to 45 mol %, more preferably 15 to 42 mol %, further preferably 20 to 40 mol %, from the viewpoint of moisture absorption resistance and the viewpoint of solubility in neutral water.

A modeling material with high heat resistance generally has a high melting point, or a high glass transition temperature, and when the temperature for heat-melting, extruding, and laminating the modeling material by a 3D printer is remarkably different from the temperature of the support material contacting the modeling material, the modeling accuracy of a three-dimensional object is sometimes deteriorated. Therefore, when the modeling material with a high melting point, or a high glass transition temperature is heat-melted, extruded, and laminated by a 3D printer, the soluble material for three-dimensional modeling as a material of the support material is also heat-melted, extruded, and laminated at a temperature close to the temperature of the modeling material. In this case, the soluble material for three-dimensional modeling as a material of the support material removable by neutral water that is not a strong alkaline aqueous solution and has a pH of 6 to 8 also preferably has a high melting point, or a high glass transition temperature. Therefore, the thermoplastic resin is preferably at least one type selected from the group consisting of a polyester resin, a polyamide resin, an acrylic resin, a polyvinyl alcohol resin, a polyvinyl pyrrolidone resin, an ester amide resin, and a urethane resin, more preferably at least one type selected from the group consisting of a polyester resin and a polyamide resin.

[Polyester Resin]

Examples of the polyester resin include a polyester resin having the dicarboxylic acid monomer unit A and a diol monomer unit.

(Diol Monomer Unit)

The polyester resin has a diol monomer unit. The diol for deriving the diol monomer unit is also referred to as diol C.

The diol C is not particularly limited, and aliphatic diol, aromatic diol, etc. can be used. However, from a viewpoint of the production cost of the polyester resin, the diol C is preferably aliphatic diol.

From the viewpoints of the solubility into neutral water, moisture absorption resistance, and heat resistance required for modeling by a 3D printer, the number of carbon atoms in the diol C is preferably 2 or more; and from the same viewpoints, it is preferably 31 or less, more preferably 25 or less, further preferably 20 or less, and further more preferably 15 or less.

An example of the aliphatic diol is at least one type selected from the group consisting of chain diol and cyclic diol. From the viewpoints of the solubility into neutral water, moisture absorption resistance, and toughness (strength) required for modeling by a 3D printer, chain diol is preferable.

From the viewpoints of the solubility into neutral water, moisture absorption resistance, and heat resistance required for modeling by a 3D printer, the number of carbon atoms in the chain diol is preferably 2 or more; and from the same viewpoints, it is preferably 6 or less, more preferably 4 or less, and further preferably 3 or less.

From the viewpoints of the solubility into neutral water, moisture absorption resistance, and heat resistance required for modeling by a 3D printer, the number of carbon atoms in the cyclic diol is preferably 6 or more; and from the same viewpoints, it is preferably 31 or less, more preferably 30 or less, and further preferably 27 or less.

The diol C may have ether oxygen. However, if the diol C is a chain aliphatic diol, from the viewpoints of the solubility into neutral water, moisture absorption resistance, and heat resistance required for modeling by a 3D printer, the number of the ether oxygen is preferably 1 or less; and if the diol C is a cyclic aliphatic diol, from the same viewpoints, the number of the ether oxygen is preferably 2 or less.

From the viewpoints of the solubility into neutral water, moisture absorption resistance, and heat resistance required for modeling by a 3D printer, the chain diol is preferably at least one type selected from the group consisting of ethylene glycol, 1,2-propanediol, 1,3-propanediol, diethylene glycol, and dipropylene glycol; and more preferably at least one type selected from the group consisting of ethylene glycol, diethylene glycol, 1,2-propaneediol, and 1,3-propanediol. Among these, diethylene glycol and dipropylene glycol may be prepared as a raw material for polymerization or may be generated during the polymerization.

From the viewpoints of the solubility into neutral water, moisture absorption resistance, and heat resistance required for modeling by a 3D printer, the cyclic diol is preferably at least one type selected from the group consisting of 1,4-cyclohexane dimethanol, hydrogenated bisphenol A, isosorbide, bisphenoxyethanolfluorene, bisphenolfluorene, biscresoxyethanolfluorene, and biscresolfluorene.

If the diol C is at least one type selected from the group consisting of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorenem and biscresolfluorene; from the viewpoints of the solubility into neutral water, moisture absorption resistance, and heat resistance required for modeling by a 3D printer; the ratio of the total amount of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorene and biscresolfluorene to the total amount of all diol monomer units in the polyester resin is preferably 80 mol % or more, more preferably 90 mol % or more, further preferably 95 mol % or more, further more preferably 98 mol % or more, especially preferably substantially 100 mol %, and more especially preferably 100 mol %.

Examples of the polyester resin can be shown by the following formulas (II) and (III).

[Formula 1]

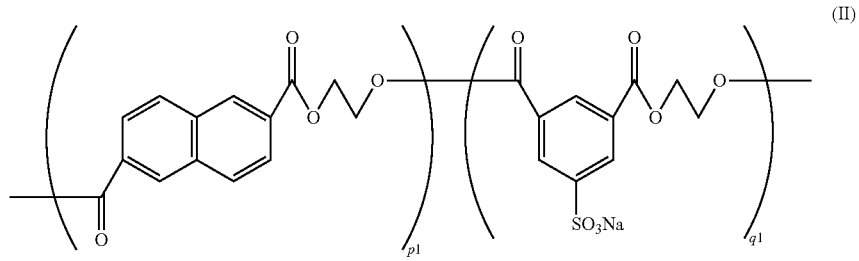

(In the formula (II), p1 represents the number-average degree of polymerization of ethylene 2,6-naphthalene dicarboxylate, and q1 represents the number-average degree of polymerization of ethylene 5-sulfoisophthalate. However, ethylene 2,6-naphthalene dicarboxylate and ethylene 5-sulfoisophthalate are a block copolymer and/or a random copolymer; and from the viewpoint of the solubility into neutral water, they preferably are a random copolymer.)

ethanolfluorene and 5-sulfoisophthalate. However, ethylene 2,6-naphthalene dicarboxylate, ethylene 5-sulfoisophthalate, a condensate of bisphenoxyethanolfluorene and 2,6-naphthalene dicarboxylate, and a condensate of bisphenoxyethanolfluorene and 5-sulfoisophthalate are polymerized to form a block copolymer and/or a random copolymer; and from the viewpoint of the solubility into neutral water, they are polymerized to form a random copolymer.)

[Formula 2]

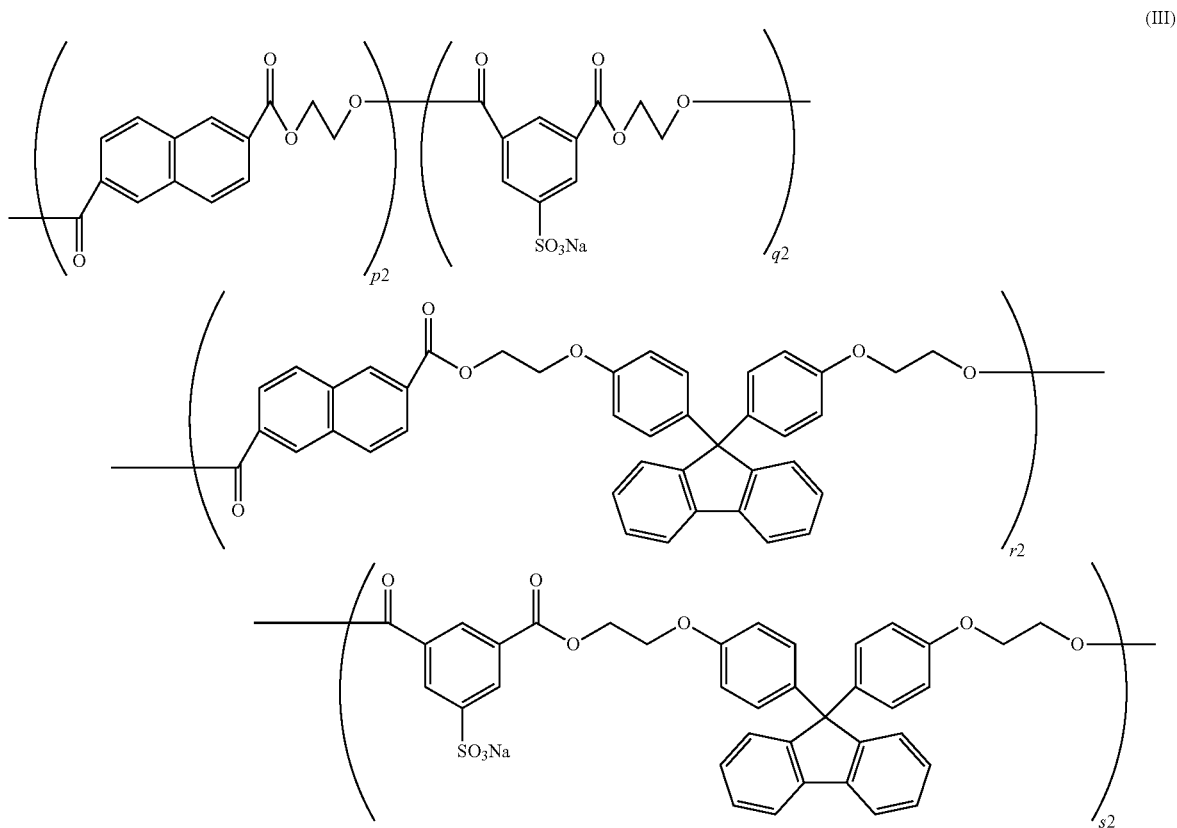

(In the formula (III), p2 represents the number-average degree of polymerization of ethylene 2,6-naphthalene dicarboxylate, q2 represents the number-average degree of polymerization of ethylene 5-sulfoisophthalate, r2 represents the number-average degree of polymerization of a condensate of bisphenoxyethanolfluorene and 2,6-naphthalene dicarboxylate, and s2 represents the number-average degree of polymerization of a condensate of bisphenoxy-

[Polyamide Resin]

Examples of the polyamide resin include a polyamide resin having the dicarboxylic acid monomer unit A and a diamine monomer unit.

[Diamine Monomer Unit]

The polyamide resin has a diamine monomer unit. The diamine for deriving the diamine monomer unit is also referred to as diamine C.

The diamine C is not particularly limited, and at least one type selected from the group consisting of aliphatic diamine, alicyclic diamine, and aromatic diamine can be used. However, from a viewpoint of the easiness of the polymerization when producing the polyamide resin, the diamine C is preferably aliphatic diamine.

From the viewpoints of the solubility into neutral water, moisture absorption resistance, heat resistance required for modeling by a 3D printer, and easiness of the polymerization when producing the polyamide resin, the number of carbon atoms in the diamine C is preferably 2 or more, more preferably 3 or more, and further preferably 4 or more; and from the viewpoints of the solubility into neutral water, moisture absorption resistance, and heat resistance required for modeling by a 3D printer, it is preferably 20 or less, more preferably 15 or less, and further preferably 10 or less.

Examples of the aliphatic diamine include ethylenediamine, trimethylenediamine, tetramethylenediamine, pentamethylenediamine, hexamethylenediamine, heptamethylenediamine, octamethylenediamine, nonanediamine, and decanediamine. Among these, from the viewpoints of the solubility into neutral water, moisture absorption resistance, and toughness (strength) required for modeling by a 3D printer, hexamethylenediamine is preferable.

Examples of the alicyclic diamine include 4,4'-diamino-3,3'-dimethyldicyclohexylmethane, diamine cyclohexane, and isophoronediamine. Among these, from the viewpoints of the solubility into neutral water, moisture absorption resistance, and toughness (strength) required for modeling by a 3D printer, at least one type selected from the group consisting of diaminecyclohexane and isophoronediamine is preferable and at least one type selected from the group consisting of diaminecyclohexane is more preferable.

Examples of the aromatic diamine include phenylene diamine, diethyltoluenediamine, and 4,4'-diaminodiphenylmethane. Among these, from the viewpoints of the solubility into neutral water, moisture absorption resistance, and toughness (strength) required for modeling by a 3D printer, at least one type selected from the group consisting of phenylene diamine and diethyltoluenediamine is preferable and at least one type selected from the group consisting of phenylenediamine is more preferable.

From the viewpoints of the solubility into neutral water, moisture absorption resistance, and toughness (strength) required for modeling by a 3D printer, the diamine C is preferably at least one type selected from the group consisting of hexamethylenediamine, diaminecyclohexane, and phenylenediamine, more preferably at least one type selected from the group consisting of hexamethylenediamine and phenylenediamine, and further preferably hexamethylene diamine.

If the diamine C is at least one type selected from the group consisting of hexamethylenediamine, diaminecyclohexane, and phenylenediamine; from the viewpoints of the solubility into neutral water, moisture absorption resistance, and heat resistance required for modeling by a 3D printer; the ratio of the total amount of hexamethylenediamine, diaminecyclohexane, and phenylenediamine to the total amount of all diamine monomer units in the polyamide resin is preferably 50 mol % or more, more preferably 70 mol % or more, further preferably 80 mol % or more, further more preferably 90 mol % or more, especially preferably substantially 100 mol %, and more especially preferably 100 mol %. "Substantially 100 mol %" means that a case is included in which substances other than hexamethylenediamine, diaminecyclohexane, and phenylenediamine are inevitably mixed in the diamine C.

Examples of the polyamide resin can be shown in the following formulas (IV) to (IX).

[Formula 3]

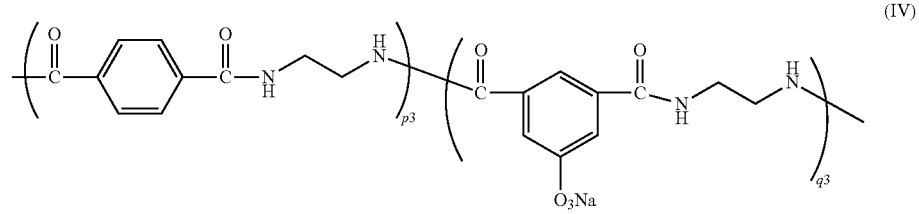

(IV)

(In the formula (IV), p3 and q3 represent the number-average degree of polymerization respectively. The polymer may be a block copolymer or a random copolymer; and from the viewpoint of the solubility into neutral water, the polymer is preferably a random copolymer.)

[Formula 4]

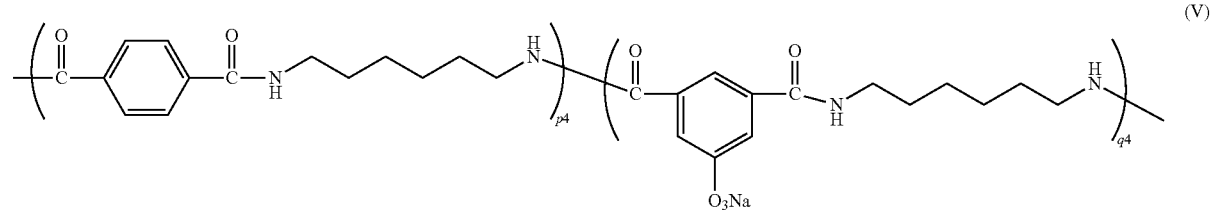

(V)

(In the formula (V), p4 and q4 represent the number-average degree of polymerization respectively. The polymer may be a block copolymer or a random copolymer; and from the viewpoint of the solubility into neutral water, the polymer is preferably a random copolymer.)

[Formula 4]

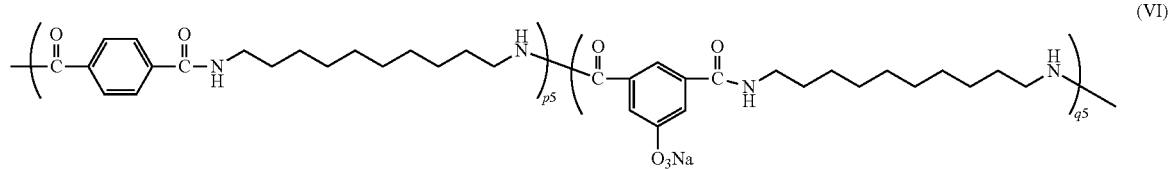

(VI)

(In the formula (VI), p5 and q5 represent the number-average degree of polymerization respectively. The polymer may be a block copolymer or a random copolymer; and from the viewpoint of the solubility into neutral water, the polymer is preferably a random copolymer.)

[Formula 6]

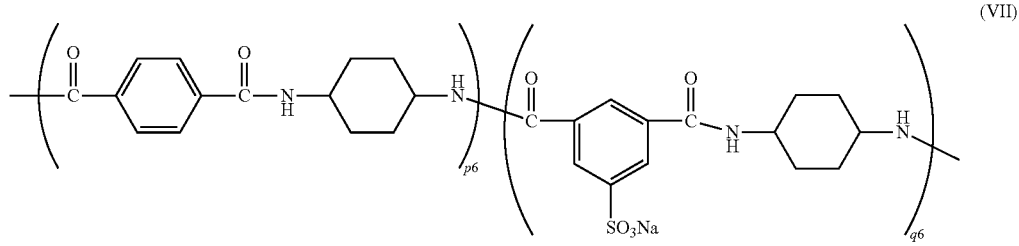

(VII)

(In the formula (VII), p6 and q6 represent the number-average degree of polymerization respectively. The polymer may be a block copolymer or a random copolymer; and from the viewpoint of the solubility into neutral water, the polymer is preferably a random copolymer.)

[Formula 7]

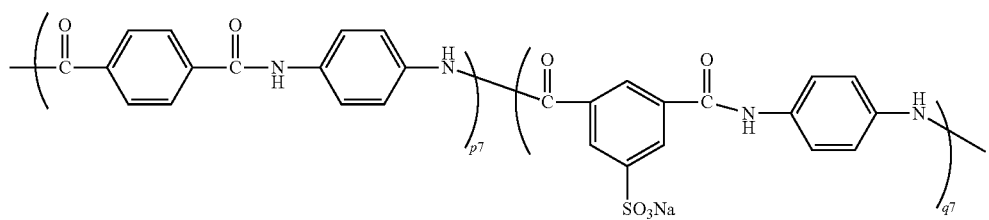

(VIII)

(In the formula (VIII), p7 and q7 represent the number-average degree of polymerization respectively. The polymer may be a block copolymer or a random copolymer; and from the viewpoint of the solubility into neutral water, the polymer is preferably a random copolymer.)

[Formula 8]

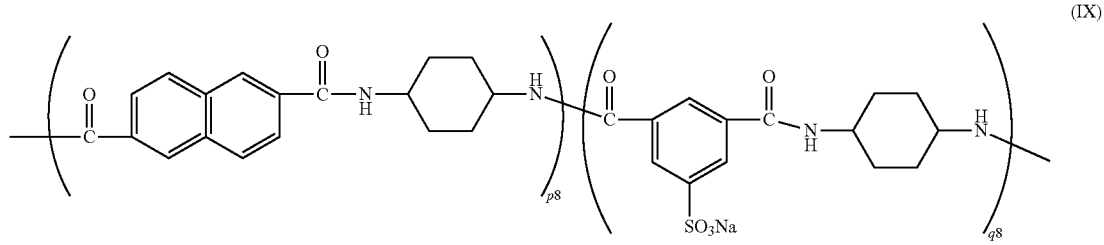

(IX)

(In the formula (IX), p8 and q8 represent the number-average degree of polymerization respectively. The polymer may be a block copolymer or a random copolymer; and from the viewpoint of the solubility into neutral water, the polymer is preferably a random copolymer.)

The thermoplastic resin may have monomer unit other than the monomer unit A, the diol monomer unit, and the diamine monomer unit as long as the effect of the present embodiment is not impaired.

From a viewpoint of improving the toughness required for a soluble material for three-dimensional modeling, the weight average molecular weight of the thermoplastic resin is preferably 3,000 or more, more preferably 10,000 or more, further preferably 16,000 or more; and from the viewpoints of solubility into neutral water and the modeling property by a 3D printer, the weight average molecular weight of the thermoplastic resin is preferably 70,000 or less, more preferably 50,000 or less, further preferably 40,000 or less, and further more preferably 35,000 or less. In the present specification, the weight average molecular weight is obtained with a method described in the example.

From the viewpoint of modeling properties by a 3D printer, the glass transition temperature (Tg) of the thermoplastic resin is preferably 50° C. or higher, more preferably 60° C. or higher, further preferably 70° C. or higher, and even more preferably 80° C. or higher; and from the same viewpoint, the glass transition temperature is preferably 250° C. or lower, more preferably 220° C. or lower, further preferably 180° C. or lower, further more preferably 160° C. or lower, further more preferably 140° C. or lower, and further more preferably 120° C. or lower. Herein, the glass transition temperature is measured by the method described in the examples.

From a viewpoint of the modeling property by a 3D printer, the content of the thermoplastic resin in the thermoplastic resin composition is preferably 70% by mass or more, and more preferably 80% by mass or more; and preferably 95% by mass or less, and more preferably 90% by mass or less.

[Organic Salt Compound]

In the general formula (I), $R^1$ represents a hydrocarbon group that optionally has a substituent group and that has 1 to 30 carbon atoms, from a viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer. The hydrocarbon group may be any one of an aliphatic hydrocarbon group, an alicyclic hydrocarbon group, and an aromatic hydrocarbon group. When being an aliphatic hydrocarbon group, the hydrocarbon group has preferably 1 or more carbon atoms, more preferably 4 or more carbon atoms, further preferably 8 or more carbon atoms and preferably 30 or less carbon atoms, more preferably 25 or less carbon atoms, further preferably 20 or less carbon atoms, from the viewpoint of suppressing coloring, the viewpoint of the dissolubility to neutral water, the viewpoint of the moisture absorption resistance, and the viewpoint of the heat resistance required for modeling by a 3D printer. When being an alicyclic hydrocarbon group, the hydrocarbon group has preferably 3 or more carbon atoms, more preferably 5 or more carbon atoms, further preferably 6 or more carbon atoms, further more preferably 10 or more carbon atoms and preferably 30 or less carbon atoms, more preferably 25 or less carbon atoms, further preferably 20 or less carbon atoms, from the viewpoint of suppressing coloring, the viewpoint of the dissolubility to neutral water, the viewpoint of the moisture absorption resistance, and a viewpoint of the heat resistance required for modeling by a 3D printer. When being an aromatic hydrocarbon group, the hydrocarbon group has preferably 6 or more carbon atoms, more preferably 8 or more carbon atoms, further preferably 10 or more carbon atoms and preferably 30 or less carbon atoms, more preferably 25 or less carbon atoms, from the viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer.

The substituent group is preferably one containing at least one type selected from the group consisting of a hydrogen atom, a carbon atom, an oxygen atom, a nitrogen atom, a sulfur atom, a phosphorus atom, a silicon atom, and a halogen atom, from the viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer. Particularly, the substituent group is preferably a hydrocarbon group or an alkyl halide group having 1 to 22 carbon atoms, more preferably a hydrocarbon group or an alkyl halide group having 1 to 16 carbon atoms, further preferably a hydrocarbon group or an alkyl halide group having 1 to 12 carbon atoms, further more preferably a hydrocarbon group having 1 to 12 carbon atoms.

In the general formula (I), $X^{n+}$ represents a sodium ion, a potassium ion, a lithium ion, an ammonium ion, a phosphonium ion, a magnesium ion, a calcium ion, a barium ion, a zinc ion, or a phosphonium ion, is preferably a sodium ion, a potassium ion, a lithium ion, a magnesium ion, an ammonium ion, or a phosphonium ion, is more preferably a sodium ion, a lithium ion, an ammonium ion, or a phosphonium ion, is further preferably a lithium ion or a phosphonium ion, and is further more preferably a phosphonium ion, from the viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer. Particularly, the phosphonium ion is preferably a tetraalkylphosphonium ion, more preferably a tetrabutylphosphonium ion, from the viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer.

In the general formula (I), n is preferably 1, from the viewpoint of control of the molecular weight during manufacture of the thermoplastic resin, the viewpoint of suppressing coloring, the viewpoint of solubility in neutral water, the viewpoint of moisture absorption resistance, and the viewpoint of heat resistance required for molding by a 3D printer.

As the method for manufacturing a thermoplastic resin of the present embodiment, a conventionally known method for manufacturing a thermoplastic resin is applicable except the step of mixing the organic salt compound. For example, when the thermoplastic resin is the polyester resin, the polyester resin is manufactured by a two-step process including: a first step of subjecting a dimethyl ester of the sulfonate group-containing dicarboxylic acid component a, an alkyl ester of the dicarboxylic acid component B such as dimethyl terephthalate, and the diol C to a transesterification reaction by heating under normal pressure in the presence of a transesterification catalyst; and a second step of subjecting a reaction product obtained through the reaction under normal pressure to a polycondensation reaction by heating under reduced pressure in the presence of polymerization catalyst, until the reaction product gives a desired weight average molecular weight. Except that these reactions are performed in the presence of the organic salt compound, a conventionally known method for manufacturing a polyester resin is applicable.

In the manufacture of a polyester resin, the timing of adding the organic salt compound is not particularly limited, but the organic salt compound is added preferably before the start of pressure reduction from a viewpoint of operability during the manufacture and the viewpoint of control of the weight average molecular weight of the polyester resin, preferably in the reaction under normal pressure from a viewpoint of suppressing decomposition of the organic salt compound subjected to a thermal history, more preferably immediately before the start of the reaction under reduced pressure.

The polyester resin is manufactured by heating the reaction product under reduced pressure in the presence of the catalyst for the reaction under reduced pressure and thus subjecting the reaction product to the polycondensation reaction until the reaction product gives the desired weight average molecular weight. Whether the polyester resin has reached the desired weight average molecular weight can be figured out by detecting the viscosity of the reaction product in the reaction under reduced pressure. Examples of a method for detecting the melt viscosity of the reaction product include a method for measuring a load on a stirrer for stirring the reaction product during the reaction under reduced pressure. The conventional method for manufacturing a polyester resin shows a tendency of giving an inconstant load on a stirrer due to rapid thickening of the polyester resin during the reaction under reduced pressure. Therefore, with the method for detecting the melt viscosity of the reaction product, it is difficult to adjust the weight average molecular weight of the polyester resin involving the soluble material for three-dimensional modeling to a preferable weight average molecular weight. The reaction under reduced pressure in the presence of the organic salt compound, however, suppresses the rapid thickening of the polyester resin and raises the viscosity of the reaction product containing the polyester resin along with progress of the polymerization of the polyester resin, to make it easier to figure out the weight average molecular weight of the polyester resin by the viscosity of the reaction product than the conventional method and thus to enable easy adjustment of the weight average molecular weight of the polyester resin involving the soluble material for three-dimensional modeling to a preferably weight average molecular weight.

The organic salt compound is added so as to give a ratio of the amount (mol) of an alkylsulfonic acid ion ($R^1$—$SO_3^-$) in the organic salt compound to the total amount (mol) of the sulfonic acid group and the sulfonate group in the thermoplastic resin (amount of alkylsulfonic acid ion in organic salt compound/total amount of sulfonic acid group and sulfonate group in thermoplastic resin) of preferably 0.005 or more, more preferably 0.01 or more, further preferably 0.02 or more, further more preferably 0.03 or more, from the viewpoint of solubility in neutral water, the viewpoint of facilitating control of the weight average molecular weight of the thermoplastic resin during the manufacture, and the viewpoint of suppressing coloring. The organic salt compound is added so as to give a ratio of preferably 0.35 or less, more preferably 0.25 or less, further preferably 0.2 or less, from the viewpoint of solubility in neutral water and the viewpoint of heat resistance required for modeling by a 3D printer.

The thermoplastic resin composition has moisture absorption resistance and a high dissolution speed in neutral water.

<Soluble Material for Three-Dimensional Modeling>

The soluble material for three-dimensional modeling of the present embodiment is a thermoplastic resin composition obtained by the above manufacturing method.

The soluble material for three-dimensional modeling may include a component different from the above-mentioned components as far as the advantageous effects of the present embodiment are not damaged. Examples of the different component include polymers other than the thermoplastic resin, a plasticizer such as any polyalkylene glycol diester of benzoic acid; fillers such as calcium carbonate, magnesium carbonate, glass spheres, graphite, carbon black, carbon fiber, glass fiber, talc, wollastonite, mica, alumina, silica, kaolin, whisker, and silicon carbide; compatibilizers; elastomers.

From the viewpoint of the modeling property by a 3D printer, the glass transition temperature of the soluble material for three-dimensional modeling is preferably 50° C. or higher, more preferably 60° C. or higher, further preferably 70° C. or higher, and further more preferably 80° C. or higher; and from the same viewpoint, the glass transition temperature of the soluble material for three-dimensional modeling is preferably 250° C. or lower, more preferably 220° C. or lower, and further preferably 200° C. or lower.

The method for manufacturing the soluble material for three-dimensional modeling is not particularly limited, and a conventionally known method for manufacturing a soluble material for three-dimensional modeling can be adopted. As an example of the manufacturing method of the soluble material for three-dimensional formation, there is a method of manufacturing by kneading raw materials such as the thermoplastic resin composition with a kneader such as a batch type kneader or a twin screw extruder.

The form of the soluble material for three-dimensional modeling is not particularly limited, and examples of the form include a pellet, powder, and a filament. However, from the viewpoint of the modeling property by a 3D printer, a filament is preferable.

From the viewpoint of the modeling property by a 3D printer and the viewpoint of improving the modeling accuracy of a three-dimensional object, the diameter of the filament is preferably 0.5 mm or more, and more preferably 1.0 mm or more; from the same viewpoints, the diameter of the filament is preferably 3.0 mm or less, more preferably 2.0 mm or less, and further preferably 1.8 mm or less. From a viewpoint of enhancing the toughness, a drawing process is preferably performed to produce a filament. From the viewpoint of improving the toughness while maintaining solubility, the draw ratio is preferably 1.5 times or more, more preferably 2 times or more, further preferably 3 times or more, further more preferably 5 times or more; and from the same viewpoint, the draw ratio is preferably 200 times or less, more preferably 150 times or less, further preferably 100 times or less, and further more preferably 50 times or less. The drawing temperature is preferably in a range of a temperature from 20° C. lower than the glass transition temperature of the soluble material for three-dimensional modeling to 110° C. higher than the glass transition temperature. From the viewpoint of improving the toughness and a viewpoint of thermal stability, the lower limit of the drawing temperature is more preferably 10° C. lower than the glass transition temperature, and further preferably same as the glass transition temperature. From the same viewpoints, the upper limit of the drawing temperature is more preferably 110° C. higher than the glass transition temperature, further preferably 100° C. higher than the glass transition temperature, and further more preferably 90° C. higher than the glass transition temperature. The drawing may be performed while air cooling when the resin is discharged from the extruder or the resin may be heated by hot air or a laser. The drawing may be performed in one stage to a prescribed filament diameter at a prescribed draw ratio or multiple stages to a prescribed filament diameter at a prescribed draw ratio.

<Method for Manufacturing a Three-Dimensional Object>

A method for manufacturing a three-dimensional object according to the present embodiment is a method for manufacturing a three-dimensional object by a fused deposition modeling system, the method including a step of obtaining a precursor of the three-dimensional object containing the three-dimensional object and a support material; and a support material removing step of bringing the precursor of the three-dimensional object into contact with neutral water to remove the support material, in which a material of the support material is the soluble material for three-dimensional modeling. The method for manufacturing a three-dimensional object is capable of suppressing the degradation of the modeling accuracy of a three-dimensional object and has a high rate of dissolution to neutral water to be removable speedily from a precursor of the three-dimensional object without use of a strong alkaline aqueous solution.

[Step of Obtaining Precursor of Three-Dimensional Object Containing Three-Dimensional Object and Support Material]

As the step of obtaining a precursor of a three-dimensional object containing the three-dimensional object and the support material, a step of obtaining a precursor of a three-dimensional object containing the three-dimensional object and the support material of a known method for manufacturing a three-dimensional object with a fused deposition modeling type 3D printer can be used, except that the material of the support material is the soluble material for three-dimensional modeling.

The modeling material that is a material of the three-dimensional object is not particularly limited as long as the modeling material is a resin that can be used as a modeling material in the method for manufacturing a three-dimensional object of a conventional FDM system. Examples of the modeling material include thermoplastic resins such as an ABS resin, a PP resin, an ASA resin, a PS resin, a HIPS resin, a PVC resin, a polylactate resin, a polycarbonate resin, a polyamide resin, a polyetherimide resin, a polyetheretherketone resin, and a polyphenylsulfone resin. Among these, from the viewpoint of the modeling property by a 3D printer, at least one type selected from the group consisting of an ABS resin, a polylactate resin, a polycarbonate resin, and a polyamide resin are preferable, and at least one type selected from the group consisting of an ABS resin, a polycarbonate resin, and a polyamide resin are more preferable.

From the viewpoints of the modeling property by a 3D printer, the glass transition temperature of the support material used in the step of obtaining precursor of three-dimensional object is preferably from (the glass transition temperature of the modeling material to be used −20° C.) to (the glass transition temperature of the modeling material to be used +20° C.), more preferably from (the glass transition temperature of the modeling material to be used −15° C.) to (the glass transition temperature of the modeling material to be used +15° C.)

[Support Material Removing Step of Bringing the Precursor of the Three-Dimensional Object into Contact with Neutral Water to Remove the Support Material]

The precursor of the three-dimensional object is made to contact a neutral water to remove the support material in the support material removing step. The method of making the precursor of the three-dimensional object contact the neutral water is preferably a method of soaking the precursor of the three-dimensional object in the neutral water from the viewpoints of cost and ease of work. From the viewpoint of improving removability of the support material, the precursor of the three-dimensional object is irradiated with ultrasonic waves while being soaked in the neutral water to promote dissolution of the support material.

[Neutral Water]

Examples of the neutral water include ion exchange water, pure water, tap water, and industrial water. From the viewpoint of economy, ion exchange water and tap water are preferred. The neutral water may contain a water-soluble organic solvent as far as the solvent does not damage the resultant modeled three-dimensional object. Examples of the water-soluble organic solvent include lower alcohols such as methanol, ethanol, and 2-propanol; glycol ethers such as propylene glycol monomethyl ether, ethylene glycol monoethyl ether, ethylene glycol mono-t-butyl ether, and diethylene glycol monobutyl ether; and ketones such as acetone, and methyl ethyl ketone. When the neutral water contains the water-soluble organic solvent, the content of the water-soluble organic solvent in the neutral water is preferably 0.1% or more by mass, more preferably 0.5% or more by mass, even more preferably 1% or more by mass, even more preferably 3% or more by mass, and is preferably 50% or less by mass, more preferably 40% or less by mass, further preferably 30% or less by mass, further more preferably 20% or less by mass.

The amount of the neutral water used is preferably 10 mass times or more, and more preferably 20 mass times or more the support material from the viewpoint of the solubility of the support material. The amount of the neutral water used is preferably 10,000 mass times or less, more preferably 5,000 mass times or less, further preferably 1,000 mass times or less, and further more preferably 100 mass times or less the support material from the economic viewpoint.

The period over which the soluble material for three-dimensional modeling is caused to contact the neutral water is preferably 5 minutes or longer from the viewpoint of the removability of the support material, and is preferably 180 minutes or shorter, more preferably 120 minutes or shorter, even more preferably 90 minutes or shorter from the viewpoint of economy, and a decrease of damage which the three-dimensional object suffers through the contact of the object with the neutral water over a long period. The washing temperature, which depends on the species of the modeling material, is preferably 15° C. or higher, more preferably 25° C. or higher, even more preferably 30° C. or higher, even more preferably 40° C. or higher from the viewpoint of economy, the removability of the support material, and a decrease of damage which the three-dimensional object suffers. From the same viewpoint, the temperature is preferably 85° C. or lower, more preferably 70° C. or lower, even more preferably 60° C. or lower.

<Support Material>

The support material according to the present embodiment is a support material for supporting a three-dimensional object when the three-dimensional object is manufactured by a 3D printer of a fused deposition modeling system, the support material containing the thermoplastic resin composition. The support material has sufficient strength, is less colored to have excellent appearance quality, and has a high rate of dissolution to neutral water to be removable speedily from a precursor of the three-dimensional object without use of a strong alkaline aqueous solution.

<Thermoplastic Resin Composition>

A thermoplastic resin composition according to the present embodiment contains a thermoplastic resin having a sulfonic acid group and/or sulfonate group, and an organic salt compound represented by a general formula (I) below:

$$(R^1-SO_3^-)_n X^{n+} \quad (I).$$

(wherein $R^1$ represents a hydrocarbon group that may have a substituent and has 1 to 30 carbon atoms, n represents a number of 1 or 2, and when n is 1, $X^{n+}$ represents a sodium ion, a potassium ion, a lithium ion, an ammonium ion, or a phosphonium ion, and when n is 2, $X^{n+}$ represents a magnesium ion, a calcium ion, a barium ion, or a zinc ion.)

[Thermoplastic Resin]

The thermoplastic resin has dicarboxylic acid monomer units derived from a dicarboxylic acid component. The dicarboxylic acid monomer units contain an aromatic dicarboxylic acid monomer unit derived from a sulfonic acid group and/or sulfonate group-containing aromatic dicarboxylic acid component, from the viewpoint of solubility in neutral water that is not a strong alkaline aqueous solution and has a pH of 6 to 8.

[Dicarboxylic Acid Monomer Unit A]

(Dicarboxylic Acid Monomer Unit a)

From the viewpoint of the solubility into neutral water and the viewpoint of the easiness of the polymerization when producing the thermoplastic resin, the sulfonate group is preferably a sulfonate group represented by $-SO_3M^3$ ($M^3$ represents a counterion of a sulfonic acid group constituting the sulfonate group; and from the viewpoint of the solubility into neutral water, it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

The aromatic dicarboxylic acid component a is at least one type selected from the group consisting of a sulfonic acid group-containing aromatic dicarboxylic acid and a sulfonate group-containing aromatic dicarboxylic acid. The aromatic dicarboxylic acid component a is preferably at least one type selected from the group consisting of 5-sulfoisophthalic acid, 2-sulfoterephthalic acid, and 4-sulfo-2,6-naphthalene dicarboxylic acid, more preferably at least one type selected from the group consisting of 5-sulfoisophthalic acid and 2-sulfoterephthalic acid, and further preferably 5-sulfoisophthalic acid, from the viewpoint of solubility in neutral water, the viewpoint of moisture absorption resistance, the viewpoint of heat resistance required for modeling by a 3D printer, and the viewpoint of an easy polymerization reaction during manufacture of the thermoplastic resin.

The dicarboxylic acid monomer unit A have a proportion of the dicarboxylic acid monomer unit a of preferably 10 mol % or more, more preferably 16 mol % or more, further preferably 20 mol % or more, further more preferably 23 mol % or more, from the viewpoint of solubility in neutral water, and have a proportion of preferably 90 mol % or less, more preferably 80 mol % or less, further preferably 70 mol % or less, further more preferably 65 mol % or less, from the viewpoint of moisture absorption resistance and the viewpoint of heat resistance required for modeling by a 3D printer. Further, the dicarboxylic acid monomer unit A has a proportion of the dicarboxylic acid monomer unit a of preferably 10 to 90 mol %, more preferably 16 to 80 mol %, further preferably 20 to 70 mol %, further more preferably 23 to 65 mol %, from the viewpoint of solubility in neutral water, the viewpoint of moisture absorption resistance, the viewpoint of heat resistance required for modeling by a 3D printer, and the viewpoint of an easy polymerization reaction during manufacture of the thermoplastic resin.

From the viewpoint of the solubility into neutral water, a total content of the sulfonic acid group and the sulfonate group in the thermoplastic resin is preferably 0.5 mmol/g or more, more preferably 0.6 mmol/g or more, and further preferably 0.7 mmol/g or more; and from the viewpoint of moisture absorption resistance, it is preferably 3.0 mmol/g or less, more preferably 1.5 mmol/g or less, and further preferably 1.0 mmol/g or less. From the viewpoint of the solubility into neutral water and the viewpoint of moisture absorption resistance, the total content of the sulfonic acid group and the sulfonate group in the thermoplastic resin is preferably 0.5 mmol/g to 3.0 mmol/g, more preferably 0.6 mmol/g to 1.5 mmol/g, and further preferably 0.7 mmol/g to 1.0 mmol/g.

A dicarboxylic acid monomer unit A other than the dicarboxylic acid monomer unit a is not particularly limited, but is preferably a dicarboxylic acid monomer unit derived from a non-hydrophilic group-containing dicarboxylic acid component, from the viewpoint of moisture absorption resistance and the viewpoint of heat resistance required for modeling by a 3D printer.

Examples of the hydrophilic group include a primary amino group, a secondary amino group, a tertiary amino group, a quaternary ammonium salt group, an oxyethylene group, a hydroxyl group, a carboxyl group, a carboxylate group, a phosphoric acid group, and a phosphate group.

The dicarboxylic acid B is not particularly limited as long as it is a non-hydrophilic group-containing dicarboxylic acid. However, from the viewpoint of moisture absorption resistance, the viewpoint of heat resistance required for modeling by a 3D printer, and the viewpoint of an easy polymerization reaction during manufacture of the polyester resin, the dicarboxylic acid B is preferably at least one type selected from the group consisting of aromatic dicarboxylic acid, aliphatic dicarboxylic acid, and alicyclic dicarboxylic acid. Among these, from the same viewpoints, at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid are more preferable; and at least one type selected from the group consisting of terephthalic acid, 2,5-furan dicarboxylic acid, and 2,6-naphthalene dicarboxylic acid are further preferable; and 2,6-naphthalene dicarboxylic acid are further more preferable.

The thermoplastic resin has a proportion of the amount of the dicarboxylic acid monomer unit a to the total amount of all monomer units of preferably 5 mol % or more, more preferably 8 mol % or more, further preferably 10 mol % or more, and preferably 45 mol % or less, more preferably 35 mol % or less, further preferably 30 mol % or less, from the viewpoint of solubility in neutral water, the viewpoint of moisture absorption resistance, the viewpoint of heat resistance required for modeling by a 3D printer, and the viewpoint of an easy polymerization reaction during manufacture of the thermoplastic resin. Further, the thermoplastic resin has a proportion of the amount of the dicarboxylic acid monomer unit a to the total amount of all monomer units of preferably 5 to 45 mol %, more preferably 8 to 40 mol %, further preferably 10 to 35 mol %, from the viewpoint of solubility in neutral water, the viewpoint of moisture absorption resistance, the viewpoint of heat resistance required for modeling by a 3D printer, and the viewpoint of an easy polymerization reaction during manufacture of the thermoplastic resin.

The thermoplastic resin has a proportion of the amount of the dicarboxylic acid monomer unit B to the total amount of all monomer units of preferably 5 mol % or more, more preferably 15 mol % or more, further preferably 20 mol % or more, from the viewpoint of moisture absorption resistance, and has a proportion of preferably 45 mol % or less, more preferably 42 mol % or less, further preferably 40 mol % or less, from the viewpoint of solubility in neutral water. Further, the thermoplastic resin has a proportion of the amount of the dicarboxylic acid monomer unit B to the total amount of all monomer units of preferably 5 to 45 mol %, more preferably 15 to 42 mol %, further preferably 20 to 40 mol %, from the viewpoint of moisture absorption resistance and the viewpoint of solubility in neutral water.

A modeling material with high heat resistance generally has a high melting point, or a high glass transition temperature, and when the temperature for heat-melting, extruding, and laminating the modeling material by a 3D printer is remarkably different from the temperature of the support material contacting the modeling material, the modeling accuracy of a three-dimensional object is sometimes deteriorated. Therefore, when the modeling material with a high melting point, or a high glass transition temperature is heat-melted, extruded, and laminated by a 3D printer, the soluble material for three-dimensional modeling as a material of the support material is also heat-melted, extruded, and laminated at a temperature close to the temperature of the modeling material. In this case, the soluble material for three-dimensional modeling as a material of the support material removable by neutral water that is not a strong alkaline aqueous solution and has a pH of 6 to 8 also preferably has a high melting point, or a high glass transition temperature. Therefore, the thermoplastic resin is preferably at least one type selected from the group consisting of a polyester resin, a polyamide resin, an acrylic resin, a polyvinyl alcohol resin, a polyvinyl pyrrolidone resin, an ester amide resin, and a urethane resin, more preferably at least one type selected from the group consisting of a polyester resin and a polyamide resin.

[Polyester Resin]

Examples of the polyester resin include a polyester resin having the dicarboxylic acid monomer unit A and a diol monomer unit.

From the viewpoint of solubility in neutral water, the viewpoint of moisture absorption resistance, and the viewpoint of heat resistance required for modeling by a 3D printer, the polyester resin has a proportion of the amount of the dicarboxylic acid monomer unit a to the total amount of all monomer units of preferably 10 mol % or more, and more preferably 20 mol % or more; from the same viewpoints, preferably 70 mol % or less, more preferably 65 mol % or less, further preferably 60 mol % or less, further preferably 40 mol % or less, and further preferably 27 mol % or less.

The polyester resin has a proportion of the amount of the dicarboxylic acid monomer unit B to the total amount of all monomer units of preferably 30 mol % or more, more preferably 35 mol % or more, further preferably 40 mol % or more, further more preferably 65 mol % or more, further more preferably 73 mol % or more, and preferably 90 mol % or less, more preferably 80 mol % or less, from the viewpoint of solubility in neutral water, the viewpoint of moisture absorption resistance, and the viewpoint of heat resistance required for modeling by a 3D printer.

(Diol Monomer Unit)

The polyester resin has a diol monomer unit. The diol for deriving the diol monomer unit is also referred to as diol C.

The diol C is not particularly limited, and aliphatic diol, aromatic diol, etc. can be used. However, from the viewpoint of the production cost of the polyester resin, the diol C is preferably aliphatic diol.

From the viewpoints of the solubility into neutral water, moisture absorption resistance, and heat resistance required for modeling by a 3D printer, the number of carbon atoms in the diol C is preferably 2 or more; and from the same viewpoints, it is preferably 31 or less, more preferably 25 or less, further preferably 20 or less, and further more preferably 15 or less.

An example of the aliphatic diol is at least one type selected from the group consisting of chain diol and cyclic diol. From the viewpoints of the solubility into neutral water, moisture absorption resistance, and toughness (strength) required for modeling by a 3D printer, chain diol is preferable.

From the viewpoints of the solubility into neutral water, moisture absorption resistance, and heat resistance required for modeling by a 3D printer, the number of carbon atoms in the chain diol is preferably 2 or more; and from the same viewpoints, it is preferably 6 or less, more preferably 4 or less, and further preferably 3 or less.

From the viewpoints of the solubility into neutral water, moisture absorption resistance, and heat resistance required for modeling by a 3D printer, the number of carbon atoms in the cyclic diol is preferably 6 or more; and from the same viewpoints, it is preferably 31 or less, more preferably 30 or less, and further preferably 27 or less.

The diol C may have ether oxygen. However, if the diol C is a chain aliphatic diol, from the viewpoints of the solubility into neutral water, moisture absorption resistance, and heat resistance required for modeling by a 3D printer, the number of the ether oxygen is preferably 1 or less; and if the diol C is a cyclic aliphatic diol, from the same viewpoints, the number of the ether oxygen is preferably 2 or less.

From the viewpoints of the solubility into neutral water, moisture absorption resistance, and heat resistance required for modeling by a 3D printer, the chain diol is preferably at least one type selected from the group consisting of ethylene glycol, 1,2-propanediol, 1,3-propanediol, diethylene glycol, and dipropylene glycol; and more preferably at least one type selected from the group consisting of ethylene glycol, diethylene glycol, 1,2-propaneediol, and 1,3-propanediol. Among these, diethylene glycol and dipropylene glycol may be prepared as a raw material for polymerization or may be generated during the polymerization.

From the viewpoints of the solubility into neutral water, moisture absorption resistance, and heat resistance required for modeling by a 3D printer, the cyclic diol is preferably at least one type selected from the group consisting of 1,4-cyclohexane dimethanol, hydrogenated bisphenol A, isosorbide, bisphenoxyethanolfluorene, bisphenolfluorene, biscresoxyethanolfluorene, and biscresolfluorene.

If the diol C is at least one type selected from the group consisting of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorenem and biscresolfluorene; from the viewpoints of the solubility into neutral water, moisture absorption resistance, and heat resistance required for modeling by a 3D printer; the ratio of the total amount of ethylene glycol, 1,2-propanediol, 1,3-propanediol, diethylene glycol, dipropylene glycol, 1,4-cyclohexane dimethanol, hydrogenated bisphenol A, isosorbide, bisphenoxyethanolfluorene, bisphenolfluorene, biscresoxyethanolfluorene and biscresolfluorene to the total amount of all diol monomer units in the polyester resin is preferably 80 mol % or more, more preferably 90 mol % or more, further preferably 95 mol % or more, further more preferably 98 mol % or more, especially preferably substantially 100 mol %, and more especially preferably 100 mol %.

Examples of the polyester resin can be shown by the following formulas (II) and (III).

[Formula 9]

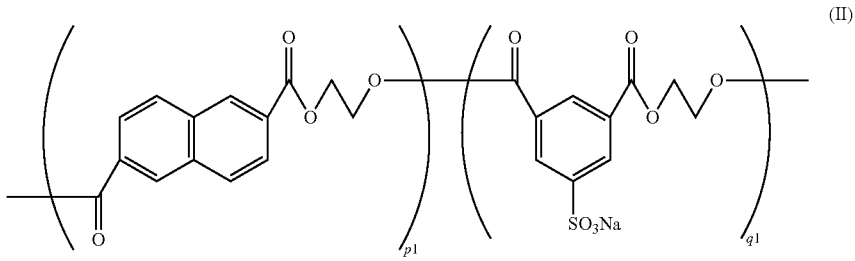

(II)

(In the formula (II), p1 represents the number-average degree of polymerization of ethylene 2,6-naphthalene dicarboxylate, and q1 represents the number-average degree of polymerization of ethylene 5-sulfoisophthalate. However, ethylene 2,6-naphthalene dicarboxylate and ethylene 5-sulfoisophthalate are a block copolymer and/or a random copolymer; and from the viewpoint of the solubility into neutral water, they preferably are a random copolymer.)

[Formula 10]

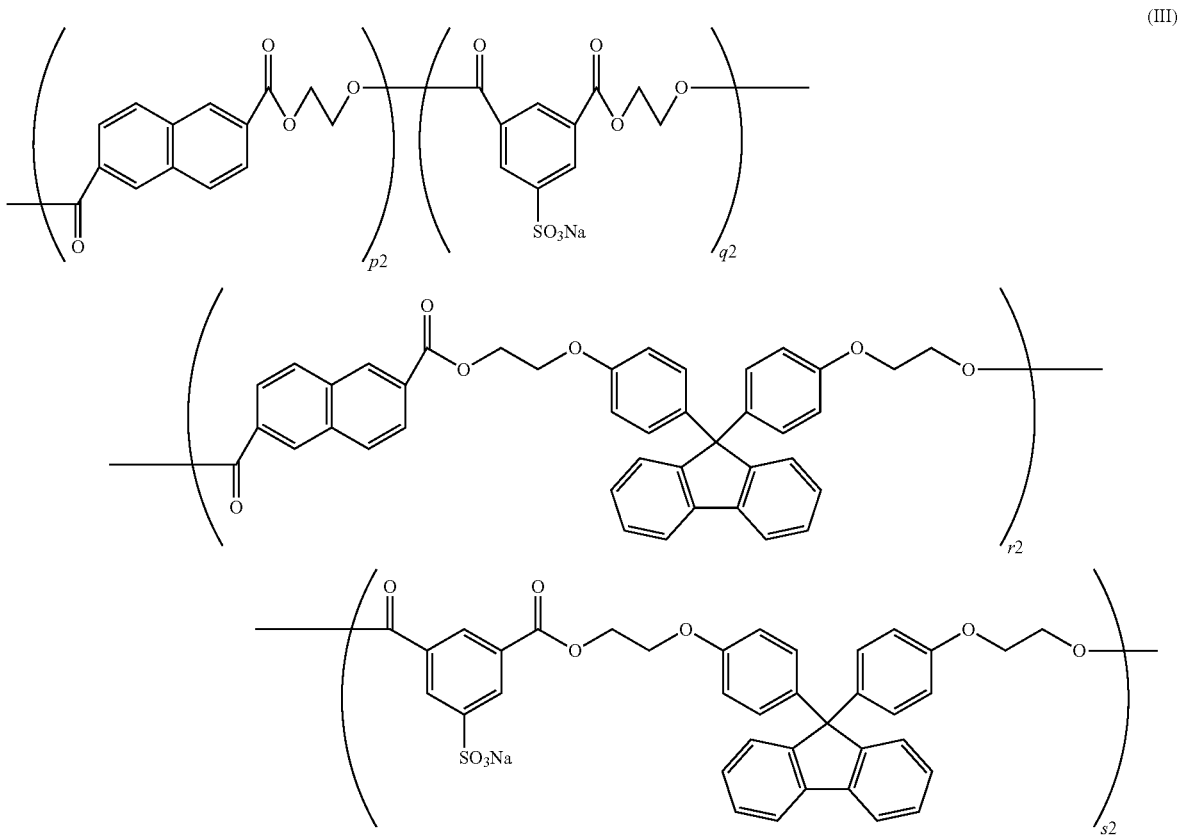

(III)

(In the formula (III), p2 represents the number-average degree of polymerization of ethylene 2,6-naphthalene dicarboxylate, q2 represents the number-average degree of polymerization of ethylene 5-sulfoisophthalate, r2 represents the number-average degree of polymerization of a condensate of bisphenoxyethanolfluorene and 2,6-naphthalene dicarboxylate, and s2 represents the number-average degree of polymerization of a condensate of bisphenoxyethanolfluorene and 5-sulfoisophthalate. However, ethylene 2,6-naphthalene dicarboxylate, ethylene 5-sulfoisophthalate, a condensate of bisphenoxyethanolfluorene and 2,6-naphthalene dicarboxylate, and a condensate of bisphenoxyethanolfluorene and 5-sulfoisophthalate are polymerized to form a block copolymer and/or a random copolymer; and from the viewpoint of the solubility into neutral water, they are polymerized to form a random copolymer.)

[Polyamide Resin]

Examples of the polyamide resin include a polyamide resin having the dicarboxylic acid monomer unit A and a diamine monomer unit.

The polyamide resin has a proportion of the amount of the dicarboxylic acid monomer unit a to the total amount of all monomer units of 2.5 mol % or more, preferably 4 mol % or more, more preferably 6 mol % or more, further preferably 8 mol % or more, and further more preferably 10 mol % or more, from the viewpoint of solubility in neutral water. Further, the polyamide resin has a proportion of the amount of the dicarboxylic acid monomer unit a to the total amount of all monomer units of 40 mol % or less, preferably 35 mol % or less, more preferably 31 mol % or less, further preferably 25 mol % or less, further more preferably 20 mol % or less, further more preferably 15 mol % or less, further more preferably 10 mol % or less, and further more preferably 8 mol % or less, from the viewpoint of moisture absorption resistance.

The polyamide resin has a proportion of the amount of the dicarboxylic acid monomer unit B to the total amount of all monomer units of preferably 10 mol % or more, more preferably 20 mol % or more, further preferably 30 mol % or more, further more preferably 35 mol % or more, further more preferably 40 mol % or more, further more preferably 42 mol % or more, from the viewpoint of moisture absorption resistance. Further, the polyamide resin has a proportion of the amount of the dicarboxylic acid monomer unit B to the total amount of all monomer units of preferably 47.5 mol % or less, more preferably 45 mol % or less, further preferably 42 mol % or less, and further preferably 40 mol % or less, from the viewpoint of solubility in neutral water.

[Diamine Monomer Unit]

The polyamide resin has a diamine monomer unit. The diamine for deriving the diamine monomer unit is also referred to as diamine C.

The diamine C is not particularly limited, and at least one type selected from the group consisting of aliphatic diamine, alicyclic diamine, and aromatic diamine can be used. However, from a viewpoint of the easiness of the polymerization when producing the polyamide resin, the diamine C is preferably aliphatic diamine.

From the viewpoints of the solubility into neutral water, moisture absorption resistance, heat resistance required for modeling by a 3D printer, and easiness of the polymerization when producing the polyamide resin, the number of carbon atoms in the diamine C is preferably 2 or more, more preferably 3 or more, and further preferably 4 or more; and from the viewpoints of the solubility into neutral water, moisture absorption resistance, and heat resistance required for modeling by a 3D printer, it is preferably 20 or less, more preferably 15 or less, and further preferably 10 or less.

Examples of the aliphatic diamine include ethylenediamine, trimethylenediamine, tetramethylenediamine, pentamethylenediamine, hexamethylenediamine, heptamethylenediamine, octamethylenediamine, nonanediamine, and decanediamine. Among these, from the viewpoints of the solubility into neutral water, moisture absorption resistance, and toughness (strength) required for modeling by a 3D printer, hexamethylenediamine is preferable.

Examples of the alicyclic diamine include 4,4'-diamino-3,3'-dimethyldicyclohexylmethane, diamine cyclohexane, and isophoronediamine. Among these, from the viewpoints of the solubility into neutral water, moisture absorption resistance, and toughness (strength) required for modeling by a 3D printer, at least one type selected from the group consisting of diaminecyclohexane and isophoronediamine is preferable and at least one type selected from the group consisting of diaminecyclohexane is more preferable.

Examples of the aromatic diamine include phenylene diamine, diethyltoluenediamine, and 4,4'-diaminodiphenylmethane. Among these, from the viewpoints of the solubility into neutral water, moisture absorption resistance, and toughness (strength) required for modeling by a 3D printer, at least one type selected from the group consisting of phenylene diamine and diethyltoluenediamine is preferable and at least one type selected from the group consisting of phenylenediamine is more preferable.

From the viewpoints of the solubility into neutral water, moisture absorption resistance, and toughness (strength) required for modeling by a 3D printer, the diamine C is preferably at least one type selected from the group consisting of hexamethylenediamine, diaminecyclohexane, and phenylenediamine, more preferably at least one type selected from the group consisting of hexamethylenediamine and phenylenediamine, and further preferably hexamethylene diamine.

If the diamine C is at least one type selected from the group consisting of hexamethylenediamine, diaminecyclohexane, and phenylenediamine; from the viewpoints of the solubility into neutral water, moisture absorption resistance, and heat resistance required for modeling by a 3D printer; the ratio of the total amount of hexamethylenediamine, diaminecyclohexane, and phenylenediamine to the total amount of all diamine monomer units in the polyamide resin is preferably 50 mol % or more, more preferably 70 mol % or more, further preferably 80 mol % or more, further more preferably 90 mol % or more, especially preferably substantially 100 mol %, and more especially preferably 100 mol %. "Substantially 100 mol %" means that a case is included in which substances other than hexamethylenediamine, diaminecyclohexane, and phenylenediamine are inevitably mixed in the diamine C.

Examples of the polyamide resin can be shown in the following formulas (IV) to (IX).

[Formula 11]

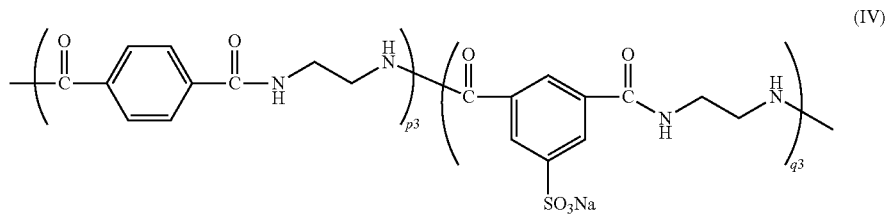

(IV)

(In the formula (IV), p3 and q3 represent the number-average degree of polymerization respectively. The polymer may be a block copolymer or a random copolymer; and from the viewpoint of the solubility into neutral water, the polymer is preferably a random copolymer.)

[Formula 12]

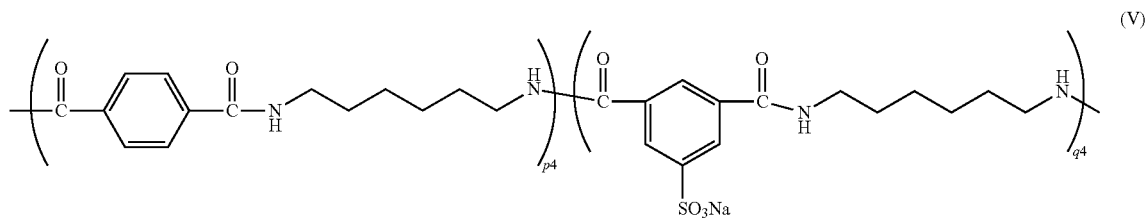

(V)

(In the formula (V), p4 and q4 represent the number-average degree of polymerization respectively. The polymer may be a block copolymer or a random copolymer; and from the viewpoint of the solubility into neutral water, the polymer is preferably a random copolymer.)

[Formula 13]

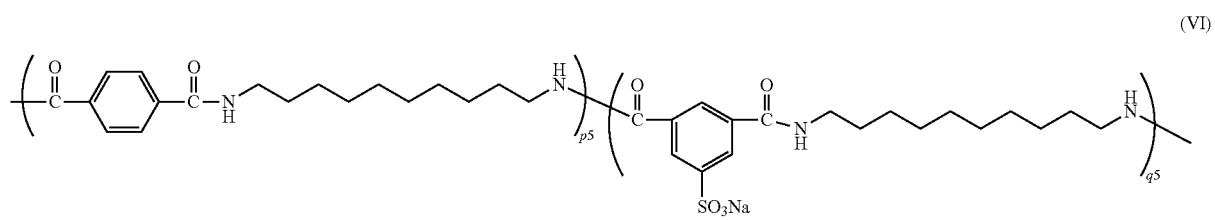

(VI)

(In the formula (VI), p5 and q5 represent the number-average degree of polymerization respectively. The polymer may be a block copolymer or a random copolymer; and from the viewpoint of the solubility into neutral water, the polymer is preferably a random copolymer.)

[Formula 14]

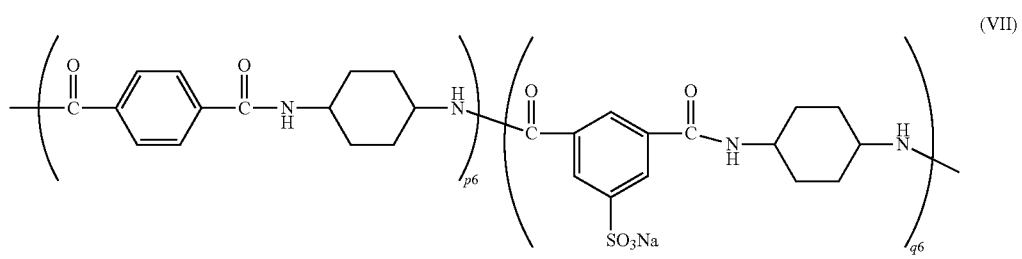

(VII)

(In the formula (VII), p6 and q6 represent the number-average degree of polymerization respectively. The polymer may be a block copolymer or a random copolymer; and from the viewpoint of the solubility into neutral water, the polymer is preferably a random copolymer.)

[Formula 15]

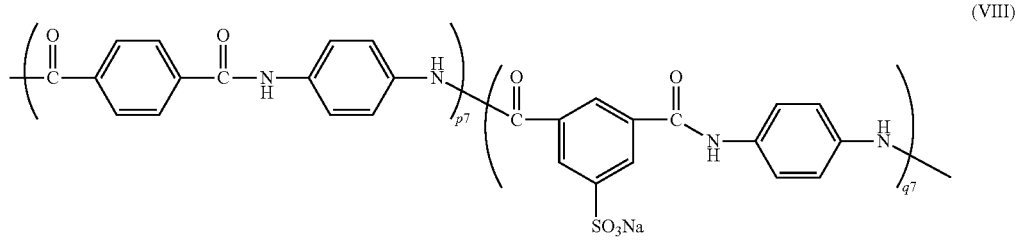

(VIII)

(In the formula (VIII), p7 and q7 represent the number-average degree of polymerization respectively. The polymer may be a block copolymer or a random copolymer; and from the viewpoint of the solubility into neutral water, the polymer is preferably a random copolymer.)

[Formula 16]

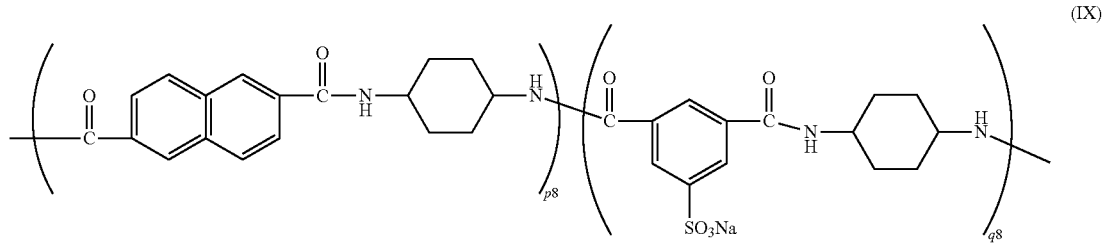

(IX)

(In the formula (IX), p8 and q8 represent the number-average degree of polymerization respectively. The polymer may be a block copolymer or a random copolymer; and from the viewpoint of the solubility into neutral water, the polymer is preferably a random copolymer.)

The thermoplastic resin may have monomer unit other than the monomer unit A, the diol monomer unit, and the diamine monomer unit as long as the effect of the present embodiment is not impaired.

From the viewpoint of improving the toughness required for a soluble material for three-dimensional modeling, the weight average molecular weight of the thermoplastic resin is preferably 3,000 or more, more preferably 10,000 or more, further preferably 16,000 or more; and from the viewpoints of solubility into neutral water and the modeling property by a 3D printer, the weight average molecular weight of the thermoplastic resin is preferably 70,000 or less, more preferably 50,000 or less, further preferably 40,000 or less, and further more preferably 35,000 or less.

From the viewpoint of modeling properties by a 3D printer, the glass transition temperature (Tg) of the thermoplastic resin is preferably 50° C. or higher, more preferably 60° C. or higher, further preferably 70° C. or higher, and even more preferably 80° C. or higher; and from the same viewpoint, the glass transition temperature is preferably 250° C. or lower, more preferably 220° C. or lower, further preferably 180° C. or lower, further more preferably 160° C. or lower, further more preferably 140° C. or lower, and further more preferably 120° C. or lower.

From the viewpoint of the modeling property by a 3D printer, the content of the thermoplastic resin in the thermoplastic resin composition is preferably 70% by mass or more, and more preferably 80% by mass or more; and preferably 95% by mass or less, and more preferably 90% by mass or less.

[Organic Salt Compound]

In the general formula (I), $R^1$ represents a hydrocarbon group that optionally has a substituent group and that has 1 to 30 carbon atoms, from the viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer. The hydrocarbon group may be any one of an aliphatic hydrocarbon group, an alicyclic hydrocarbon group, and an aromatic hydrocarbon group. When being an aliphatic hydrocarbon group, the hydrocarbon group has preferably 1 or more carbon atoms, more preferably 4 or more carbon atoms, further preferably 8 or more carbon atoms and preferably 30 or less carbon atoms, more preferably 25 or less carbon atoms, further preferably 20 or less carbon atoms, from the viewpoint of suppressing coloring, the viewpoint of the dissolubility to neutral water, the viewpoint of the moisture absorption resistance, and the viewpoint of the heat resistance required for modeling by a 3D printer. When being an alicyclic hydrocarbon group, the hydrocarbon group has preferably 3 or more carbon atoms, more preferably 5 or more carbon atoms, further preferably 6 or more carbon atoms, further more preferably 10 or more carbon atoms and preferably 30 or less carbon atoms, more preferably 25 or less carbon atoms, further preferably 20 or less carbon atoms, from the viewpoint of suppressing coloring, the viewpoint of the dissolubility to neutral water, the viewpoint of the moisture absorption resistance, and the viewpoint of the heat resistance required for modeling by a 3D printer. When being an aromatic hydrocarbon group, the hydrocarbon group has preferably 6 or more carbon atoms, more preferably 8 or more carbon atoms, further preferably 10 or more carbon atoms and preferably 30 or less carbon atoms, more preferably 25 or less carbon atoms, from the viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer.

The substituent group is preferably one containing at least one type selected from the group consisting of a hydrogen atom, a carbon atom, an oxygen atom, a nitrogen atom, a sulfur atom, a phosphorus atom, a silicon atom, and a halogen atom, from the viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer. Particularly, the substituent group is preferably a hydrocarbon group or an alkyl halide group having 1 to 22 carbon atoms, more preferably a hydrocarbon group or an alkyl halide group having 1 to 16 carbon atoms, further preferably a hydrocarbon group or an alkyl halide group having 1 to 12 carbon atoms, further more preferably a hydrocarbon group having 1 to 12 carbon atoms.

In the general formula (I), $X^{n+}$ represents a sodium ion, a potassium ion, a lithium ion, an ammonium ion, a phosphonium ion, a magnesium ion, a calcium ion, a barium ion, a zinc ion, or a phosphonium ion, is preferably a sodium ion, a potassium ion, a lithium ion, a magnesium ion, an ammonium ion, or a phosphonium ion, is more preferably a sodium ion, a lithium ion, an ammonium ion, or a phosphonium ion, is further preferably a lithium ion or a phosphonium ion, and is further more preferably a phosphonium ion, from the viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer. Particularly, the phosphonium ion is preferably a tetraalkylphosphonium ion, more preferably a tetrabutylphosphonium ion, from the viewpoint of facilitating control of the molecular weight during the manufacture, the viewpoint of suppressing coloring, the viewpoint of the dissolubility to neutral water, the viewpoint of the moisture absorption resistance, and the viewpoint of the heat resistance required for modeling by a 3D printer.

In the general formula (I), n is preferably 1, from the viewpoint of control of the molecular weight during manufacture of the thermoplastic resin, the viewpoint of suppressing coloring, the viewpoint of solubility in neutral water, the viewpoint of moisture absorption resistance, and the viewpoint of heat resistance required for molding by a 3D printer.

The mass ratio (%) of the organic salt compound to the thermoplastic resin is preferably 0.5 or more, more preferably 2 or more, further preferably 6 or more, from a viewpoint of improving the adhesiveness with the modeling material, and is preferably 30 or less, more preferably 20 or less, further preferably 15 or less from the viewpoint of solubility in neutral water, the viewpoint of moisture absorption resistance, and the viewpoint of heat resistance required for modeling by a 3D printer.

The ratio of the amount (mol) of an alkylsulfonic acid ion ($R^1$—$SO_3^-$) in the organic salt compound to the total amount (mol) of the sulfonic acid group and the sulfonate group in the thermoplastic resin (amount of alkylsulfonic acid ion in organic salt compound/total amount of sulfonic acid group and sulfonate group in thermoplastic resin) is preferably 0.005 or more, more preferably 0.01 or more, further preferably 0.02 or more, further more preferably 0.03 or more, from the viewpoint of solubility in neutral water, the viewpoint of facilitating control of the weight average molecular weight of the thermoplastic resin during the manufacture, and the viewpoint of suppressing coloring. The ratio is preferably 0.35 or less, more preferably 0.25 or less, further preferably 0.2 or less, from the viewpoint of solubility in neutral water and the viewpoint of heat resistance required for modeling by a 3D printer.

In the thermoplastic resin composition, the proportion of the dicarboxylic acid monomer unit a, the proportion of the dicarboxylic acid monomer unit B, the proportion of the diol monomer unit, and the ratio of the organic salt compound to the total amount of all monomer units in the thermoplastic resin are preferably 10 to 30 mol %, 20 to 40 mol %, 40 to 60 mol %, and 0.05 mol % to 2 mol %, respectively, from the viewpoint of solubility in neutral water and the viewpoint of moisture absorption resistance.

The thermoplastic resin composition has moisture absorption resistance and a high dissolution speed in neutral water. Therefore, the thermoplastic resin composition is capable of providing a thermoplastic resin composition that is used as a material of a soluble material for three-dimensional modeling to be a support material, the support material having a high dissolution speed in neutral water to be quickly removable from a precursor of a three-dimensional object without use of a strong alkaline aqueous solution, and being less colored to have excellent appearance quality.

<Soluble Material for Three-Dimensional Modeling>

A soluble material for three-dimensional modeling according to the present embodiment is the thermoplastic resin composition.

The soluble material for three-dimensional modeling may include a component different from the above-mentioned components as far as the advantageous effects of the present embodiment are not damaged. Examples of the different component include polymers other than the thermoplastic resin, a plasticizer such as any polyalkylene glycol diester of benzoic acid; fillers such as calcium carbonate, magnesium carbonate, glass spheres, graphite, carbon black, carbon fiber, glass fiber, talc, wollastonite, mica, alumina, silica, kaolin, whisker, and silicon carbide; compatibilizers; elastomers.

From a viewpoint of the modeling property by a 3D printer, the glass transition temperature of the soluble material for three-dimensional modeling is preferably 50° C. or higher, more preferably 60° C. or higher, further preferably 70° C. or higher, and further more preferably 80° C. or higher; and from the same viewpoint, the glass transition temperature of the soluble material for three-dimensional modeling is preferably 250° C. or lower, more preferably 220° C. or lower, and further preferably 200° C. or lower.

The method for manufacturing the soluble material for three-dimensional modeling is not particularly limited, and a conventionally known method for manufacturing a soluble material for three-dimensional modeling can be adopted. As an example of the manufacturing method of the soluble material for three-dimensional formation, there is a method of manufacturing by kneading raw materials such as the thermoplastic resin composition with a kneader such as a batch type kneader or a twin screw extruder.

The form of the soluble material for three-dimensional modeling is not particularly limited, and examples of the form include a pellet, powder, and a filament. However, from a viewpoint of the modeling property by a 3D printer, a filament is preferable.

From the viewpoint of the modeling property by a 3D printer and the viewpoint of improving the modeling accuracy of a three-dimensional object, the diameter of the filament is preferably 0.5 mm or more, and more preferably 1.0 mm or more; from the same viewpoints, the diameter of the filament is preferably 3.0 mm or less, more preferably 2.0 mm or less, and further preferably 1.8 mm or less. From the viewpoint of enhancing the toughness, the drawing process is preferably performed to produce a filament. From the viewpoint of improving the toughness while maintaining solubility, the draw ratio is preferably 1.5 times or more, more preferably 2 times or more, further preferably 3 times or more, further more preferably 5 times or more; and from the same viewpoint, the draw ratio is preferably 200 times or less, more preferably 150 times or less, further preferably 100 times or less, and further more preferably 50 times or less. The drawing temperature is preferably in a range of a temperature from 20° C. lower than the glass transition temperature of the soluble material for three-dimensional modeling to 110° C. higher than the glass transition temperature. From the viewpoint of improving the toughness and the viewpoint of thermal stability, the lower limit of the drawing temperature is more preferably 10° C. lower than the glass transition temperature, and further preferably same as the glass transition temperature. From the same viewpoints, the upper limit of the drawing temperature is more preferably 110° C. higher than the glass transition temperature, further preferably 100° C. higher than the glass transition temperature, and further more preferably 90° C. higher than the glass transition temperature. The drawing may be performed while air cooling when the resin is discharged from the extruder or the resin may be heated by hot air or a laser. The drawing may be performed in one stage to a prescribed filament diameter at a prescribed draw ratio or multiple stages to a prescribed filament diameter at a prescribed draw ratio.

<Method for Manufacturing a Three-Dimensional Object>

A method for manufacturing a three-dimensional object according to the present embodiment is a method for manufacturing a three-dimensional object by a fused deposition modeling system, the method including a step of obtaining a precursor of the three-dimensional object containing the three-dimensional object and a support material; and a support material removing step of bringing the precursor of the three-dimensional object into contact with neutral water to remove the support material, in which a material of the support material is the soluble material for three-dimensional modeling. The method for manufacturing a three-dimensional object is capable of suppressing the degradation of the modeling accuracy of a three-dimensional object and has a high rate of dissolution to neutral water to be removable speedily from a precursor of the three-dimensional object without use of a strong alkaline aqueous solution.

[Step of Obtaining Precursor of Three-Dimensional Object Containing Three-Dimensional Object and Support Material]

As the step of obtaining a precursor of a three-dimensional object containing the three-dimensional object and the support material, a step of obtaining a precursor of a three-dimensional object containing the three-dimensional object and the support material of a known method for manufacturing a three-dimensional object with a fused deposition modeling type 3D printer can be used, except that the material of the support material is the soluble material for three-dimensional modeling.

The modeling material that is a material of the three-dimensional object is not particularly limited as long as the modeling material is a resin that can be used as a modeling material in the method for manufacturing a three-dimensional object of a conventional FDM system. Examples of the modeling material include thermoplastic resins such as an ABS resin, a PP resin, an ASA resin, a PS resin, a HIPS resin, a PVC resin, a polylactate resin, a polycarbonate resin, a polyamide resin, a polyetherimide resin, a polyetheretherketone resin, and a polyphenylsulfone resin. Among these, from a viewpoint of the modeling property by a 3D printer, at least one type selected from the group consisting of an ABS resin, a polylactate resin, a polycarbonate resin, and a polyamide resin are preferable, and at least one type selected from the group consisting of an ABS resin, a polycarbonate resin, and a polyamide resin are more preferable.

From the viewpoints of the modeling property by a 3D printer, the glass transition temperature of the support material used in the step of obtaining precursor of three-dimensional object is preferably from (the glass transition temperature of the modeling material to be used −20° C.) to (the glass transition temperature of the modeling material to be used +20° C.), more preferably from (the glass transition temperature of the modeling material to be used −15° C.) to (the glass transition temperature of the modeling material to be used +15° C.)

[Support Material Removing Step of Bringing the Precursor of the Three-Dimensional Object into Contact with Neutral Water to Remove the Support Material]

The precursor of the three-dimensional object is made to contact a neutral water to remove the support material in the support material removing step. The method of making the precursor of the three-dimensional object contact the neutral water is preferably a method of soaking the precursor of the three-dimensional object in the neutral water from the viewpoints of cost and ease of work. From the viewpoint of improving removability of the support material, the precursor of the three-dimensional object is irradiated with ultrasonic waves while being soaked in the neutral water to promote dissolution of the support material.

[Neutral Water]

Examples of the neutral water include ion exchange water, pure water, tap water, and industrial water. From the viewpoint of economy, ion exchange water and tap water are preferred. The neutral water may contain a water-soluble organic solvent as far as the solvent does not damage the resultant modeled three-dimensional object. Examples of the water-soluble organic solvent include lower alcohols such as methanol, ethanol, and 2-propanol; glycol ethers such as propylene glycol monomethyl ether, ethylene glycol monoethyl ether, ethylene glycol mono-t-butyl ether, and diethylene glycol monobutyl ether; and ketones such as acetone, and methyl ethyl ketone. When the neutral water contains the water-soluble organic solvent, the content of the water-soluble organic solvent in the neutral water is preferably 0.1% or more by mass, more preferably 0.5% or more by mass, even more preferably 1% or more by mass, even more preferably 3% or more by mass, and is preferably 50% or less by mass, more preferably 40% or less by mass, further preferably 30% or less by mass, further more preferably 20% or less by mass.

The amount of the neutral water used is preferably 10 mass times or more, and more preferably 20 mass times or more the support material from the viewpoint of the solubility of the support material. The amount of the neutral water used is preferably 10,000 mass times or less, more preferably 5,000 mass times or less, further preferably 1,000 mass times or less, and further preferably 100 mass times or less the support material from the economic viewpoint.

The period over which the soluble material for three-dimensional modeling is caused to contact the neutral water is preferably 5 minutes or longer from the viewpoint of the removability of the support material, and is preferably 180 minutes or shorter, more preferably 120 minutes or shorter, even more preferably 90 minutes or shorter from the viewpoint of economy, and a decrease of damage which the three-dimensional object suffers through the contact of the object with the neutral water over a long period. The washing temperature, which depends on the species of the modeling material, is preferably 15° C. or higher, more preferably 25° C. or higher, even more preferably 30° C. or higher, even more preferably 40° C. or higher from the viewpoint of economy, the removability of the support material, and a decrease of damage which the three-dimensional object suffers. From the same viewpoint, the temperature is preferably 85° C. or lower, more preferably 70° C. or lower, even more preferably 60° C. or lower.

<Support Material>

The support material of the present embodiment is a support material that supports a three-dimensional object when the three-dimensional object is manufactured by a fused deposition modeling system 3D printer, and that contains the thermoplastic resin composition. The support material has sufficient strength, is less colored to have excellent appearance quality, and has a high dissolution speed in neutral water to be quickly removable from a precursor of the three-dimensional object without use of a strong alkaline aqueous solution.

With respect to the above-described embodiment, the present description further discloses the following composition and manufacturing method.

<1> A method for manufacturing a thermoplastic resin composition containing a thermoplastic resin that has dicarboxylic acid monomer unit A derived from a dicarboxylic acid component and that has a proportion of an aromatic dicarboxylic acid monomer unit a derived from a sulfonic acid group and/or sulfonate group-containing aromatic dicarboxylic acid component a in the dicarboxylic acid monomer unit A of 10 mol % or more, the method comprising mixing an organic salt compound represented by a following general formula (I):

$$(R^1-SO_3^-)_n X^{n+} \qquad (I)$$

(wherein $R^1$ represents a hydrocarbon group that may have a substituent and has 1 to 30 carbon atoms, n represents a number of 1 or 2, and when n is 1, $X^{n+}$ represents a sodium ion, a potassium ion, a lithium ion, an ammonium ion, or a phosphonium ion, and when n is 2, $X^{n+}$ represents a magnesium ion, a calcium ion, a barium ion, or a zinc ion.)

<2> The method for manufacturing a thermoplastic resin composition according to <1>, wherein the sulfonate group is preferably a sulfonate group represented by —$SO_3M^3$ ($M^3$ represents a counterion of a sulfonic acid group constituting the sulfonate group; and it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

<3> The method for manufacturing a thermoplastic resin composition according to <1> or <2>, wherein the aromatic dicarboxylic acid component a is preferably at least one type selected from the group consisting of 5-sulfoisophthalic acid, 2-sulfoterephthalic acid, and 4-sulfo-2,6-naphthalene dicarboxylic acid, more preferably at least one type selected from the group consisting of 5-sulfoisophthalic acid and 2-sulfoterephthalic acid, and further preferably 5-sulfoisophthalic acid.

<4> The method for manufacturing a thermoplastic resin composition according to any one of <1> to <3>, wherein the dicarboxylic acid monomer unit A have a proportion of the dicarboxylic acid monomer unit a of 10 mol % or more, preferably 16 mol % or more, more preferably 20 mol % or more, further preferably 23 mol % or more, from the viewpoint of solubility in neutral water, and have a proportion of preferably 90 mol % or less, more preferably 80 mol % or less, further preferably 70 mol % or less, further more preferably 65 mol % or less, preferably 10 to 90 mol %, more preferably 16 to 80 mol %, further preferably 20 to 70 mol %, further more preferably 23 to 65 mol %.

<5> The method for manufacturing a thermoplastic resin composition according to any one of <1> to <4>, wherein a total content of the sulfonic acid group and the sulfonate group in the thermoplastic resin is preferably 0.5 mmol/g or more, more preferably 0.6 mmol/g or more, and further preferably 0.7 mmol/g or more, preferably 3.0 mmol/g or less, more preferably 1.5 mmol/g or less, and further preferably 1.0 mmol/g or less, preferably 0.5 mmol/g to 3.0 mmol/g, more preferably 0.6 mmol/g to 1.5 mmol/g, and further preferably 0.7 mmol/g to 1.0 mmol/g.

<6> The method for manufacturing a thermoplastic resin composition according to any one of <1> to <5>, wherein the thermoplastic resin has a dicarboxylic acid monomer unit B derived from a non-hydrophilic group-containing dicarboxylic acid component, wherein a dicarboxylic acid component B for deriving the dicarboxylic acid monomer unit B is preferably at least one type selected from the group consisting of aromatic dicarboxylic acid, aliphatic dicarboxylic acid, and alicyclic dicarboxylic acid, more preferably at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid, further preferably at least one type selected from the group consisting of terephthalic acid, 2,5-furan dicarboxylic acid, and 2,6-naphthalene dicarboxylic acid, and further more preferably 2,6-naphthalene dicarboxylic acid.

<7> The method for manufacturing a thermoplastic resin composition according to any one of <1> to <6>, wherein the thermoplastic resin has a proportion of the amount of the dicarboxylic acid monomer unit a to the total amount of all monomer units of preferably 5 mol % or more, more preferably 8 mol % or more, further preferably 10 mol % or more, and preferably 45 mol % or less, more preferably 35 mol % or less, further preferably 30 mol % or less, preferably 5 to 45 mol %, more preferably 8 to 40 mol %, further preferably 10 to 35 mol %.

<8> The method for manufacturing a thermoplastic resin composition according to any one of <1> to <7>, wherein the thermoplastic resin has a proportion of the amount of the dicarboxylic acid monomer unit B to the total amount of all monomer units of preferably 5 mol % or more, more preferably 15 mol % or more, further preferably 20 mol % or more, preferably 45 mol % or less, more preferably 42 mol % or less, further preferably 40 mol % or less, preferably 5 to 45 mol %, more preferably 15 to 42 mol %, further preferably 20 to 40 mol %.

<9> The method for manufacturing a thermoplastic resin composition according to any one of <1> to <8>, wherein the thermoplastic resin is preferably at least one type selected from the group consisting of a polyester resin, a polyamide resin, an acrylic resin, a polyvinyl alcohol resin, a polyvinyl pyrrolidone resin, an ester amide resin, and a urethane resin, more preferably at least one type selected from the group consisting of a polyester resin and a polyamide resin.

<11> The method for manufacturing a thermoplastic resin composition according to any one of <1> to <9>, wherein the polyester resin can be shown by the following formulas (II) or (III).

[Formula 17]

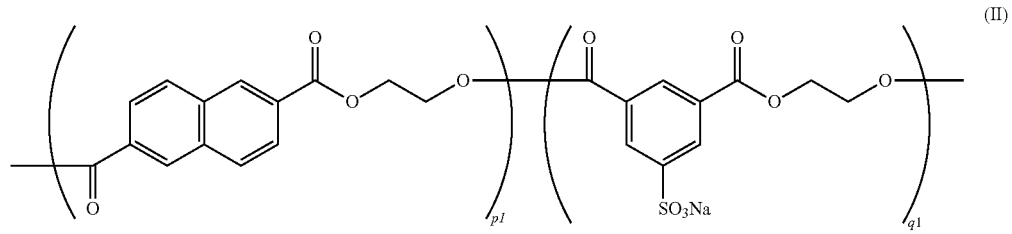

(In the formula (II), p1 represents the number-average degree of polymerization of ethylene 2,6-naphthalene dicarboxylate, and q1 represents the number-average degree of polymerization of ethylene 5-sulfoisophthalate. However, ethylene 2,6-naphthalene dicarboxylate and ethylene 5-sulfoisophthalate are a block copolymer and/or a random copolymer; and from the viewpoint of the solubility into neutral water, they preferably are a random copolymer.)

(In the formula (III), p2 represents the number-average degree of polymerization of ethylene 2,6-naphthalene dicarboxylate, q2 represents the number-average degree of polymerization of ethylene 5-sulfoisophthalate, r2 represents the number-average degree of polymerization of a condensate of bisphenoxyethanolfluorene and 2,6-naphthalene dicarboxylate, and s2 represents the number-average degree of polymerization of a condensate of bisphenoxyethanolfluorene and 5-sulfoisophthalate. However, ethylene 2,6-naphthalene dicarboxylate, ethylene 5-sulfoisophthalate, a condensate of bisphenoxyethanolfluorene and 2,6-naphthalene dicarboxylate, and a condensate of bisphenoxyethanolfluorene and 5-sulfoisophthalate are polymerized to form a block copolymer and/or a random copolymer; and from the viewpoint of the solubility into neutral water, they are polymerized to form a random copolymer.)

[Formula 18]

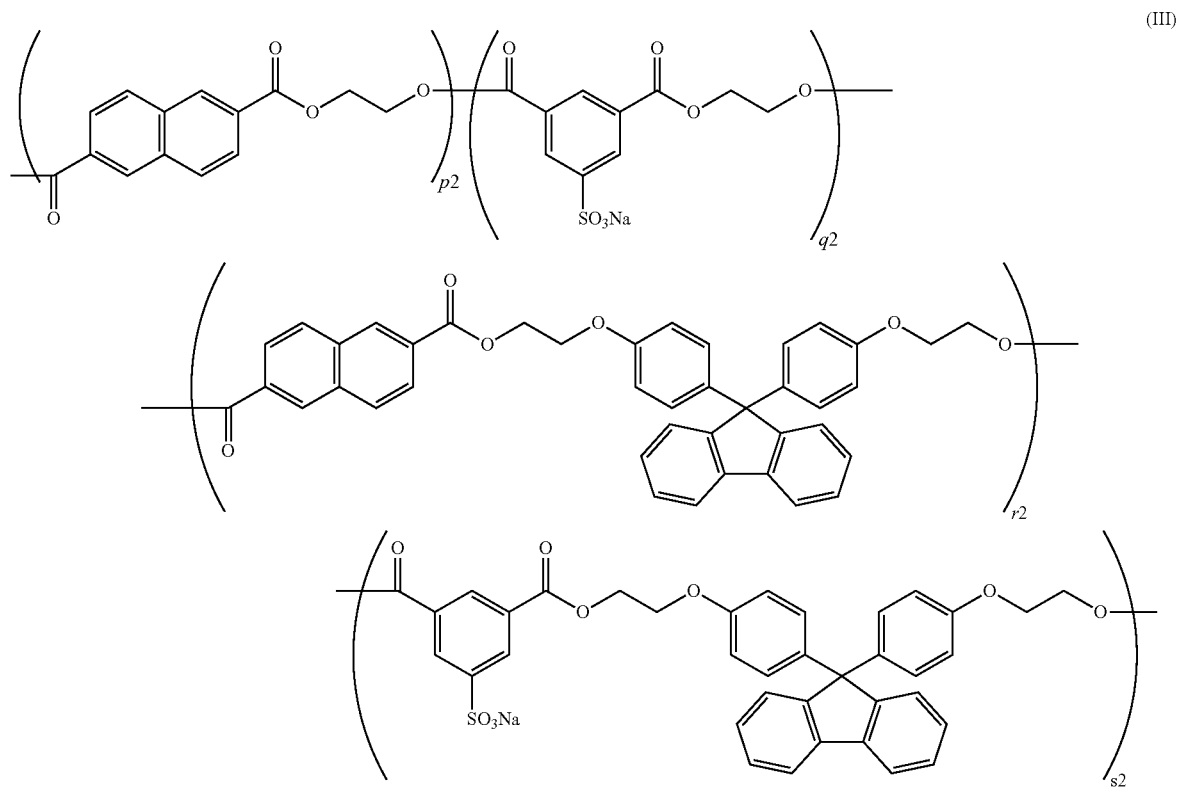

<11> The method for manufacturing a thermoplastic resin composition according to any one of <1> to <10>, wherein the polyamide resin can be shown in the following formulas (IV) to (IX).

[Formula 19]

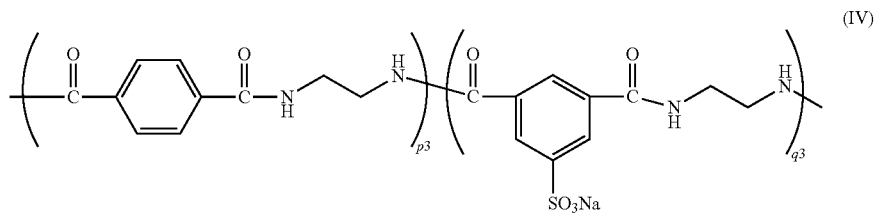

(IV)

(In the formula (IV), p3 and q3 represent the number-average degree of polymerization respectively. The polymer may be a block copolymer or a random copolymer; and from the viewpoint of the solubility into neutral water, the polymer is preferably a random copolymer.)

[Formula 20]

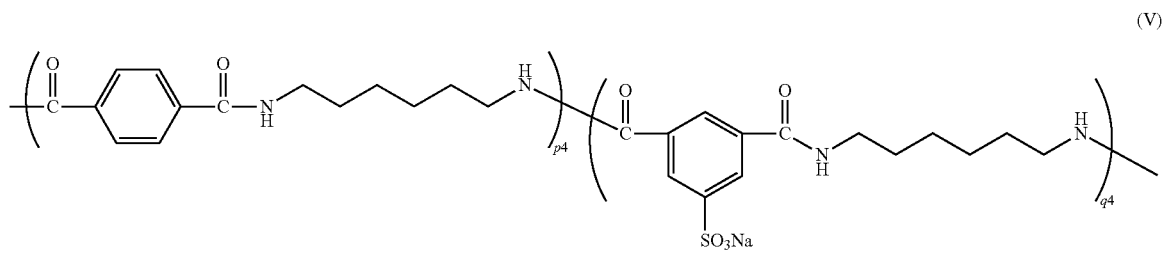

(V)

(In the formula (V), p4 and q4 represent the number-average degree of polymerization respectively. The polymer may be a block copolymer or a random copolymer; and from the viewpoint of the solubility into neutral water, the polymer is preferably a random copolymer.)

[Formula 21]

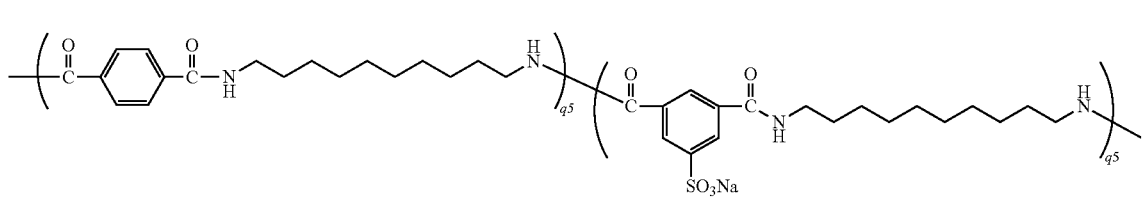

(VI)

(In the formula (VI), p5 and q5 represent the number-average degree of polymerization respectively. The polymer may be a block copolymer or a random copolymer; and from the viewpoint of the solubility into neutral water, the polymer is preferably a random copolymer.)

[Formula 22]

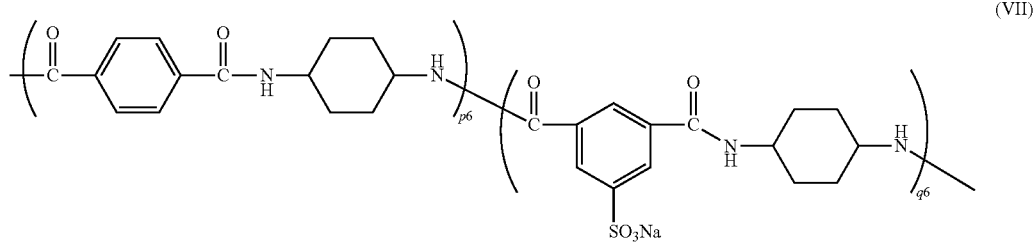

(VII)

(In the formula (VII), p6 and q6 represent the number-average degree of polymerization respectively. The polymer may be a block copolymer or a random copolymer; and from the viewpoint of the solubility into neutral water, the polymer is preferably a random copolymer.)

[Formula 23]

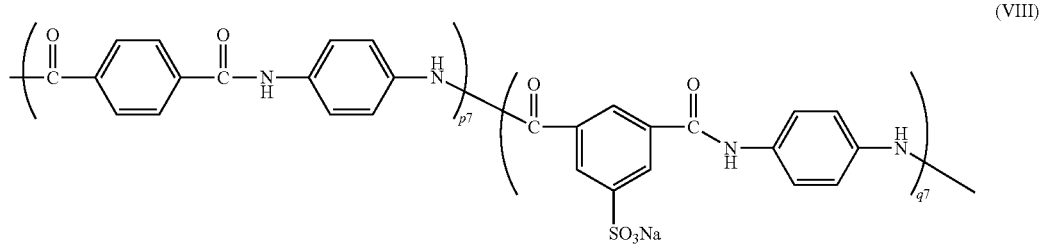

(VIII)

(In the formula (VIII), p7 and q7 represent the number-average degree of polymerization respectively. The polymer may be a block copolymer or a random copolymer; and from the viewpoint of the solubility into neutral water, the polymer is preferably a random copolymer.)

[Formula 24]

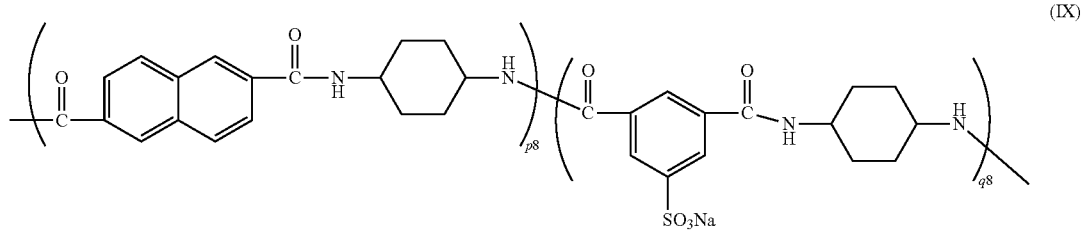

(IX)

(In the formula (IX), p8 and q8 represent the number-average degree of polymerization respectively. The polymer may be a block copolymer or a random copolymer; and from the viewpoint of the solubility into neutral water, the polymer is preferably a random copolymer.)

<12> The method for manufacturing a thermoplastic resin composition according to any one of <1> to <11>, wherein the weight average molecular weight of the thermoplastic resin is preferably 3,000 or more, more preferably 10,000 or more, further preferably 16,000 or more, preferably 70,000 or less, more preferably 50,000 or less, further preferably 40,000 or less, and further more preferably 35,000 or less.

<13> The method for manufacturing a thermoplastic resin composition according to any one of <1> to <12>, wherein the glass transition temperature (Tg) of the thermoplastic resin is preferably 50° C. or higher, more preferably 60° C. or higher, further preferably 70° C. or higher, and even more preferably 80° C. or higher preferably 250° C. or lower, more preferably 220° C. or lower, further preferably 180° C. or lower, further more preferably 160° C. or lower, further more preferably 140° C. or lower, and further more preferably 120° C. or lower.

<14> The method for manufacturing a thermoplastic resin composition according to any one of <1> to <13>, wherein the content of the thermoplastic resin in the thermoplastic resin composition is preferably 70% by mass or more, and more preferably 80% by mass or more; and preferably 95% by mass or less, and more preferably 90% by mass or less.

<15> The method for manufacturing a thermoplastic resin composition according to any one of <1> to <14>, wherein in the general formula (I), $X^{n+}$ is preferably a sodium ion, a potassium ion, a lithium ion, an ammonium ion, a phosphonium ion, a magnesium ion, a calcium ion, a barium ion, a zinc ion, or a phosphonium ion, more preferably a sodium ion, a potassium ion, a lithium ion, a magnesium ion, an ammonium ion, or a phosphonium ion, further preferably a sodium ion, a lithium ion, an ammonium ion, or a phosphonium ion, further more preferably a lithium ion or a phosphonium ion, and further more preferably a phosphonium ion, the phosphonium ion is preferably a tetraalkylphosphonium ion, more preferably a tetrabutylphosphonium ion.

<16> The method for manufacturing a thermoplastic resin composition according to any one of <1> to <15>, wherein the thermoplastic resin is the polyester resin, and the polyester resin is manufactured by a two-step process including: a first step of subjecting a dimethyl ester of the sulfonate group-containing dicarboxylic acid component a, an alkyl ester of the dicarboxylic acid component B such as dimethyl terephthalate, and the diol C to a transesterification reaction by heating under normal pressure in the presence of a transesterification catalyst; and a second step of subjecting a reaction product obtained through the reaction under normal pressure to a polycondensation reaction by heating under reduced pressure in the presence of polymerization catalyst, until the reaction product gives a desired weight average molecular weight, and these reactions are performed in the presence of the organic salt compound.

<17> The method for manufacturing a thermoplastic resin composition according to any one of <1> to <16>, wherein preferably in the reaction under normal pressure, more preferably immediately before the start of the reaction under reduced pressure.

<18> The method for manufacturing a thermoplastic resin composition according to any one of <1> to <17>, wherein the organic salt compound is added so as to give a ratio of the amount (mol) of an alkylsulfonic acid ion ($R^1$—$SO_3^-$) in the organic salt compound to the total amount (mol) of the sulfonic acid group and the sulfonate group in the thermoplastic resin (amount of alkylsulfonic acid ion in organic salt compound/total amount of sulfonic acid group and sulfonate group in thermoplastic resin) of preferably 0.005 or more, more preferably 0.01 or more, further preferably 0.02 or more, further more preferably 0.03 or more, preferably 0.35 or less, more preferably 0.25 or less, further preferably 0.2 or less.

<19> A soluble material for three-dimensional modeling comprising a thermoplastic resin composition obtained by the method for manufacturing a thermoplastic resin composition according to any one of <1> to <18>.

<20> The soluble material for three-dimensional modeling according to <19>, wherein the glass transition temperature of the soluble material for three-dimensional modeling is more preferably 60° C. or higher, further preferably 70° C. or higher, and further more preferably 80° C. or higher, preferably 250° C. or lower, more preferably 220° C. or lower, and further preferably 200° C. or lower.

<21> The soluble material for three-dimensional modeling according to <19> or <20>, wherein the form of the soluble material for three-dimensional modeling is preferably a filament.

<22> The soluble material for three-dimensional modeling according to any one of <19> to <21>, wherein the diameter of the filament is preferably 0.5 mm or more, and more preferably 1.0 mm or more, preferably 3.0 mm or less, more preferably 2.0 mm or less, and further preferably 1.8 mm or less.

<23> A method for manufacturing a three-dimensional object by a fused deposition modeling system, the method including a step of obtaining a precursor of the three-dimensional object containing the three-dimensional object and a support material; and a support material removing step of bringing the precursor of the three-dimensional object into contact with neutral water to remove the support material, wherein a material of the support material is the soluble material for three-dimensional modeling according to any one of <19> to <22>.

<24> The method for manufacturing a three-dimensional object according to <23>, wherein the modeling material that is a material of the three-dimensional object are preferably thermoplastic resins such as an ABS resin, a PP resin, an ASA resin, a PS resin, a HIPS resin, a PVC resin, a polylactate resin, a polycarbonate resin, a polyamide resin, a polyetherimide resin, a polyetheretherketone resin, and a polyphenylsulfone resin, more preferably at least one type selected from the group consisting of an ABS resin, a polylactate resin, a polycarbonate resin, and a polyamide resin, and further preferably at least one type selected from the group consisting of an ABS resin, a polycarbonate resin, and a polyamide resin.

<25> The method for manufacturing a three-dimensional object according to <23> or <24>, wherein the glass transition temperature of the support material used in the step of obtaining precursor of three-dimensional object is preferably from (the glass transition temperature of the modeling material to be used −20° C.) to (the glass transition temperature of the modeling material to be used +20° C.), more preferably from (the glass transition temperature of the modeling material to be used −15° C.) to (the glass transition temperature of the modeling material to be used +15° C.)

<26> The method for manufacturing a three-dimensional object according to any one of <23> to <25>, wherein the method of making the precursor of the three-dimensional object contact the neutral water is preferably a method of soaking the precursor of the three-dimensional object in the neutral water.

<27> The method for manufacturing a three-dimensional object according to any one of <23> to <26>, wherein the neutral water contains a water-soluble organic solvent.

<28> The method for manufacturing a three-dimensional object according to any one of <23> to <27>, wherein the water-soluble organic solvent is preferably lower alcohols such as methanol, ethanol, and 2-propanol; glycol ethers such as propylene glycol monomethyl ether, ethylene glycol monoethyl ether, ethylene glycol mono-t-butyl ether, and diethylene glycol monobutyl ether; and ketones such as acetone, and methyl ethyl ketone.

<29> The method for manufacturing a three-dimensional object according to any one of <23> to <28>, wherein the content of the water-soluble organic solvent in the neutral water is preferably 0.1% or more by mass, more preferably 0.5% or more by mass, even more preferably 1% or more by mass, even more preferably 3% or more by mass, and is preferably 50% or less by mass, more preferably 40% or less by mass, further preferably 30% or less by mass, further more preferably 20% or less by mass.

<30> The method for manufacturing a three-dimensional object according to any one of <23> to <29>, wherein the amount of the neutral water used is preferably 10 mass times or more, and more preferably 20 mass times or more the support material, preferably 10,000 mass times or less, more preferably 5,000 mass times or less, further preferably 1,000 mass times or less, and further preferably 100 mass times or less the support material.

<31> The method for manufacturing a three-dimensional object according to any one of <23> to <30>, wherein the period over which the soluble material for three-dimensional modeling is caused to contact the neutral water is preferably 5 minutes or longer, preferably 180 minutes or shorter, more preferably 120 minutes or shorter, even more preferably 90 minutes or shorter.

<32> The method for manufacturing a three-dimensional object according to any one of <23> to <31>, wherein the washing temperature is preferably 15° C. or higher, more preferably 25° C. or higher, even more preferably 30° C. or higher, even more preferably 40° C. or higher preferably 85° C. or lower, more preferably 70° C. or lower, even more preferably 60° C. or lower.

<33> A thermoplastic resin composition comprising a thermoplastic resin having a sulfonic acid group and/or sulfonate group, and an organic salt compound represented by a general formula (I) below:

$$(R^1\text{—}SO_3^-)_n X^{n+} \qquad (I).$$

(wherein $R^1$ represents a hydrocarbon group that may have a substituent and has 1 to 30 carbon atoms, n represents a number of 1 or 2, and when n is 1, $X^{n+}$ represents a sodium ion, a potassium ion, a lithium ion, an ammonium ion, or a phosphonium ion, and when n is 2, $X^{n+}$ represents a magnesium ion, a calcium ion, a barium ion, or a zinc ion.)

<34> The thermoplastic resin composition according to <33>, wherein the sulfonate group is preferably a sulfonate group represented by —$SO_3M^3$ ($M^3$ represents a counterion of a sulfonic acid group constituting the sulfonate group; and it is preferably at least one type selected from the group consisting of a sodium ion, a potassium ion, a lithium ion, calcium ion, a magnesium ion, an ammonium ion, a barium ion, and a zinc ion; more preferably at least one type selected from the group consisting of a sodium ion, a potassium ion, a lithium ion, a magnesium ion, and an ammonium ion; further preferably at least one type selected from the group consisting of a sodium ion and a potassium ion; and further more preferably a sodium ion).

<35> The thermoplastic resin composition according to <33> or <34>, wherein the thermoplastic resin has dicarboxylic acid monomer unit A derived from a dicarboxylic acid component, wherein a proportion of an aromatic dicarboxylic acid monomer unit a derived from a sulfonic acid group and/or sulfonate group-containing aromatic dicarboxylic acid component a in the dicarboxylic acid monomer unit A of 10 mol % or more.

<36> The thermoplastic resin composition according to any one of <33> to <35>, wherein the aromatic dicarboxylic acid component a is preferably at least one type selected from the group consisting of 5-sulfoisophthalic acid, 2-sulfoterephthalic acid, and 4-sulfo-2,6-naphthalene dicarboxylic acid, more preferably at least one type selected from the group consisting of 5-sulfoisophthalic acid and 2-sulfoterephthalic acid, and further preferably 5-sulfoisophthalic acid.

<37> The thermoplastic resin composition according to any one of <33> to <36>, wherein the dicarboxylic acid monomer unit A have a proportion of the dicarboxylic acid monomer unit a of 10 mol % or more, preferably 16 mol % or more, more preferably 20 mol % or more, further preferably 23 mol % or more, from the viewpoint of solubility in neutral water, and have a proportion of preferably 90 mol % or less, more preferably 80 mol % or less, further preferably 70 mol % or less, further more preferably 65 mol % or less, preferably 10 to 90 mol %, more preferably 16 to 80 mol %, further preferably 20 to 70 mol %, further more preferably 23 to 65 mol %.

<38> The thermoplastic resin composition according to any one of <33> to <37>, wherein a total content of the sulfonic acid group and the sulfonate group in the thermoplastic resin is preferably 0.5 mmol/g or more, more preferably 0.6 mmol/g or more, and further preferably 0.7 mmol/g or more, preferably 3.0 mmol/g or more, more preferably 1.5 mmol/g or less, and further preferably 1.0 mmol/g or less, preferably 0.5 mmol/g to 3.0 mmol/g, more preferably 0.6 mmol/g to 1.5 mmol/g, and further preferably 0.7 mmol/g to 1.0 mmol/g.

<39> The thermoplastic resin composition according to any one of <33> to <38>, wherein the thermoplastic resin has a dicarboxylic acid monomer unit B derived from a non-hydrophilic group-containing dicarboxylic acid component, wherein a dicarboxylic acid component B for deriving the dicarboxylic acid monomer unit B is preferably at least one type selected from the group consisting of aromatic dicarboxylic acid, aliphatic dicarboxylic acid, and alicyclic dicarboxylic acid, more preferably at least one type selected from the group consisting of terephthalic acid, isophthalic acid, 2,5-furan dicarboxylic acid, 2,6-naphthalene dicarboxylic acid, 1,4-cyclohexane dicarboxylic acid, and 1,3-adamantane dicarboxylic acid, further preferably at least one type selected from the group consisting of terephthalic acid, 2,5-furan dicarboxylic acid, and 2,6-naphthalene dicarboxylic acid, and further more preferably 2,6-naphthalene dicarboxylic acid.

<40> The thermoplastic resin composition according to any one of <33> to <39>, wherein the thermoplastic resin has a proportion of the amount of the dicarboxylic acid monomer unit a to the total amount of all monomer units of preferably 5 mol % or more, more preferably 8 mol % or more, further preferably 10 mol % or more, and preferably 45 mol % or less, more preferably 35 mol % or less, further preferably 30 mol % or less, preferably 5 to 45 mol %, more preferably 8 to 40 mol %, further preferably 10 to 35 mol %.

<41> The thermoplastic resin composition according to any one of <33> to <40>, wherein the thermoplastic resin has a proportion of the amount of the dicarboxylic acid monomer unit B to the total amount of all monomer units of preferably 5 mol % or more, more preferably 15 mol % or more, further preferably 20 mol % or more, preferably 45 mol % or less, more preferably 42 mol % or less, further preferably 40 mol % or less, preferably 5 to 45 mol %, more preferably 15 to 42 mol %, further preferably 20 to 40 mol %.

<42> The thermoplastic resin composition according to any one of <33> to <41>, wherein the thermoplastic resin is preferably at least one type selected from the group consisting of a polyester resin, a polyamide resin, an acrylic resin, a polyvinyl alcohol resin, a polyvinyl pyrrolidone resin, an ester amide resin, and a urethane resin, more preferably at least one type selected from the group consisting of a polyester resin and a polyamide resin.

<43> The thermoplastic resin composition according to any one of <33> to <42>, wherein the polyester resin is a polyester resin having the dicarboxylic acid monomer unit A and a diol monomer unit.

<44> The thermoplastic resin composition according to any one of <33> to <43>, wherein the polyester resin has a proportion of the amount of the dicarboxylic acid monomer unit a to the total amount of all monomer units of preferably 10 mol % or more, and more preferably 20 mol % or more, preferably 70 mol % or less, more preferably 65 mol % or less, further preferably 60 mol % or less, further preferably 40 mol % or less, and further preferably 27 mol % or less.

<45> The thermoplastic resin composition according to any one of <33> to <44>, wherein the polyester resin has a proportion of the amount of the dicarboxylic acid monomer unit B to the total amount of all monomer units of preferably 30 mol % or more, more preferably 35 mol % or more, further preferably 40 mol % or more, further more preferably 65 mol % or more, further more preferably 73 mol % or more, and preferably 90 mol % or less, more preferably 80 mol % or less.

<46> The thermoplastic resin composition according to any one of <33> to <45>, wherein the polyester resin can be shown by the following formulas (II) or (III).

[Formula 25]

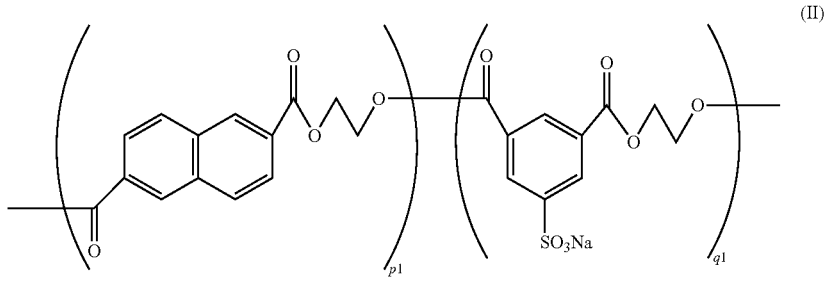

(In the formula (II), p1 represents the number-average degree of polymerization of ethylene 2,6-naphthalene dicarboxylate, and q1 represents the number-average degree of polymerization of ethylene 5-sulfoisophthalate. However, ethylene 2,6-naphthalene dicarboxylate and ethylene 5-sulfoisophthalate are a block copolymer and/or a random copolymer; and from the viewpoint of the solubility into neutral water, they preferably are a random copolymer.)

(In the formula (III), p2 represents the number-average degree of polymerization of ethylene 2,6-naphthalene dicarboxylate, q2 represents the number-average degree of polymerization of ethylene 5-sulfoisophthalate, r2 represents the number-average degree of polymerization of a condensate of bisphenoxyethanolfluorene and 2,6-naphthalene dicarboxylate, and s2 represents the number-average degree of polymerization of a condensate of bisphenoxyethanolfluorene and 5-sulfoisophthalate. However, ethylene 2,6-naphthalene dicarboxylate, ethylene 5-sulfoisophthalate, a condensate of bisphenoxyethanolfluorene and 2,6-naphthalene dicarboxylate, and a condensate of bisphenoxyethanolfluorene and 5-sulfoisophthalate are polymerized to form a block copolymer and/or a random copolymer; and

[Formula 26]

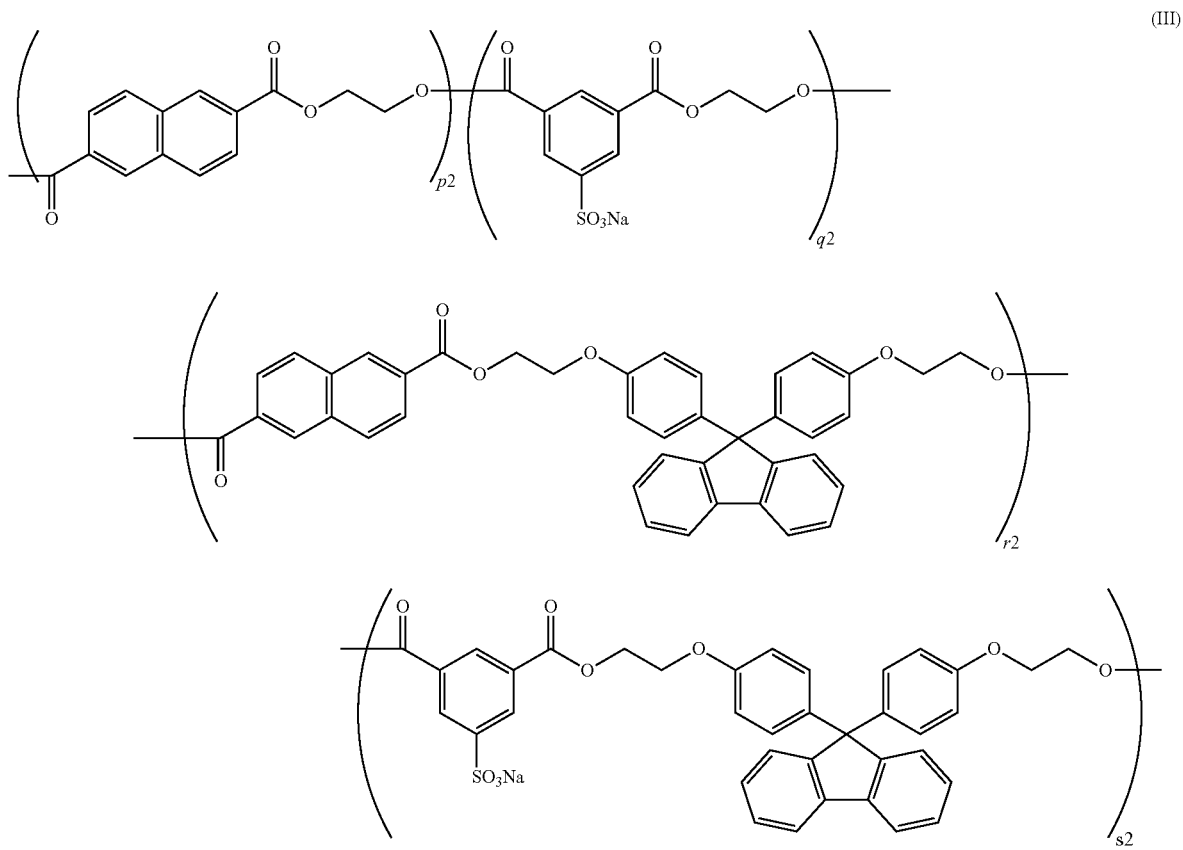

from the viewpoint of the solubility into neutral water, they are polymerized to form a random copolymer.)

<47> The thermoplastic resin composition according to any one of <33> to <46>, wherein the polyamide resin includes the dicarboxylic acid monomer unit A and a diamine monomer unit.

<48> The thermoplastic resin composition according to any one of <33> to <47>, wherein the polyamide resin has a proportion of the amount of the dicarboxylic acid monomer unit a to the total amount of all monomer units of 2.5 mol % or more, preferably 4 mol % or more, more preferably 6 mol % or more, further preferably 8 mol % or more, and further more preferably 10 mol % or more, 40 mol % or less, preferably 35 mol % or less, more preferably 31 mol % or less, further preferably 25 mol % or less, further more preferably 20 mol % or less, further more preferably 15 mol % or less, further more preferably 10 mol % or less, and further more preferably 8 mol % or less.

<49> The thermoplastic resin composition according to any one of <33> to <48>, wherein the polyamide resin has a proportion of the amount of the dicarboxylic acid monomer unit B to the total amount of all monomer units of preferably 10 mol % or more, more preferably 20 mol % or more, further preferably 30 mol % or more, further more preferably 35 mol % or more, further more preferably 40 mol % or more, further more preferably 42 mol % or more, preferably 47.5 mol % or less, more preferably 45 mol % or less, further preferably 42 mol % or less, and further preferably 40 mol % or less.

<50> The thermoplastic resin composition according to any one of <33> to <49>, wherein the polyamide resin can be shown in the following formulas (IV) to (IX).

[Formula 27]

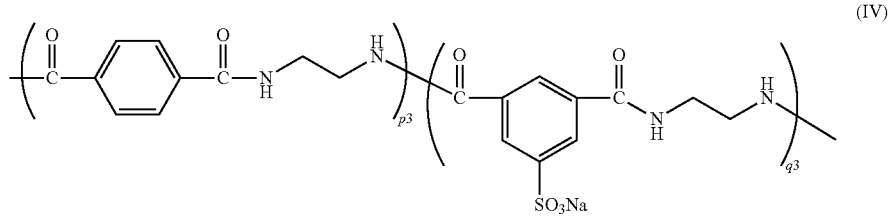

(IV)

(In the formula (IV), p3 and q3 represent the number-average degree of polymerization respectively. The polymer may be a block copolymer or a random copolymer; and from the viewpoint of the solubility into neutral water, the polymer is preferably a random copolymer.)

[Formula 28]

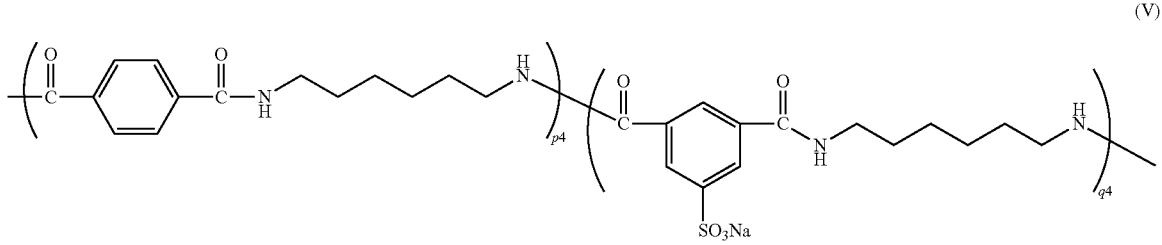

(V)

(In the formula (V), p4 and q4 represent the number-average degree of polymerization respectively. The polymer may be a block copolymer or a random copolymer; and from the viewpoint of the solubility into neutral water, the polymer is preferably a random copolymer.)

[Formula 29]

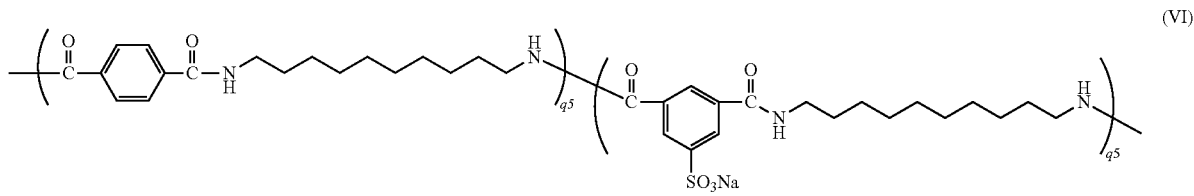

(VI)

(In the formula (VI), p5 and q5 represent the number-average degree of polymerization respectively. The polymer may be a block copolymer or a random copolymer; and from the viewpoint of the solubility into neutral water, the polymer is preferably a random copolymer.)

[Formula 30]

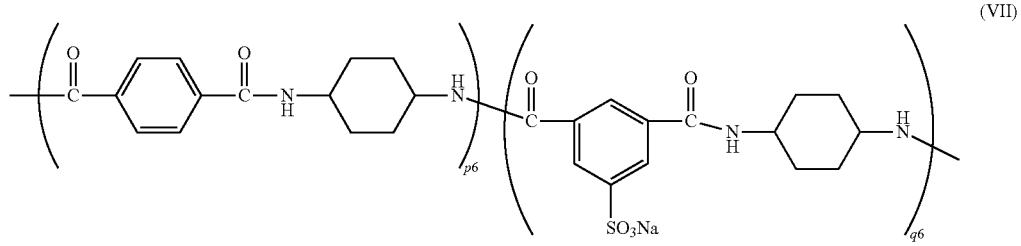

(VII)

(In the formula (VII), p6 and q6 represent the number-average degree of polymerization respectively. The polymer may be a block copolymer or a random copolymer; and from the viewpoint of the solubility into neutral water, the polymer is preferably a random copolymer.)

[Formula 31]

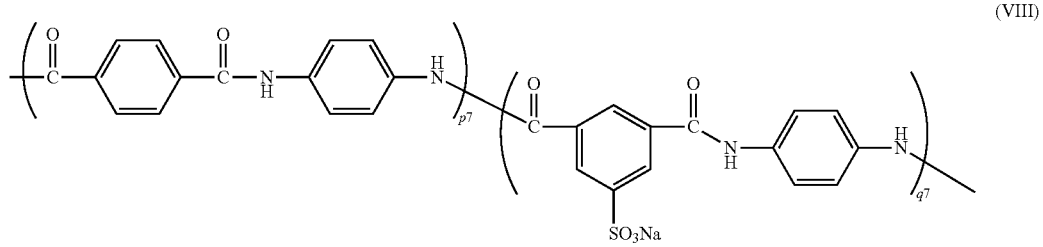

(VIII)

(In the formula (VIII), p7 and q7 represent the number-average degree of polymerization respectively. The polymer may be a block copolymer or a random copolymer; and from the viewpoint of the solubility into neutral water, the polymer is preferably a random copolymer.)

[Formula 32]

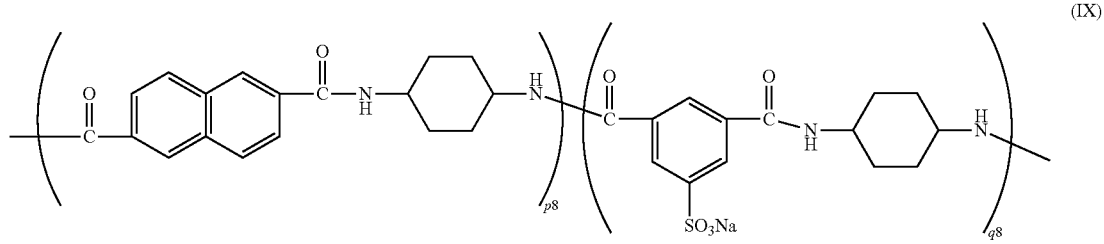

(IX)

(In the formula (IX), p8 and q8 represent the number-average degree of polymerization respectively. The polymer may be a block copolymer or a random copolymer; and from the viewpoint of the solubility into neutral water, the polymer is preferably a random copolymer.)

<51> The thermoplastic resin composition according to any one of <33> to <50>, wherein the weight average molecular weight of the thermoplastic resin is preferably 3,000 or more, more preferably 10,000 or more, further preferably 16,000 or more, preferably 70,000 or less, more preferably 50,000 or less, further preferably 40,000 or less, and further more preferably 35,000 or less.

<52> The thermoplastic resin composition according to any one of <33> to <51>, wherein the glass transition temperature (Tg) of the thermoplastic resin is preferably 50° C. or higher, more preferably 60° C. or higher, further preferably 70° C. or higher, and even more preferably 80° C. or higher preferably 250° C. or lower, more preferably 220° C. or lower, further preferably 180° C. or lower, further more preferably 160° C. or lower, further more preferably 140° C. or lower, and further more preferably 120° C. or lower.

<53> The thermoplastic resin composition according to any one of <33> to <52>, wherein the content of the thermoplastic resin in the thermoplastic resin composition is preferably 70% by mass or more, and more preferably 80% by mass or more; and preferably 95% by mass or less, and more preferably 90% by mass or less.

<54> The thermoplastic resin composition according to any one of <33> to <53>, wherein in the general formula (I), $X^{n+}$ is preferably a sodium ion, a potassium ion, a lithium ion, an ammonium ion, a phosphonium ion, a magnesium ion, a calcium ion, a barium ion, a zinc ion, or a phosphonium ion, more preferably a sodium ion, a potassium ion, a lithium ion, a magnesium ion, an ammonium ion, or a phosphonium ion, further preferably a sodium ion, a lithium ion, an ammonium ion, or a phosphonium ion, further more preferably a lithium ion or a phosphonium ion, and further more preferably a phosphonium ion, the phosphonium ion is preferably a tetraalkylphosphonium ion, more preferably a tetrabutylphosphonium ion.

<55> The thermoplastic resin composition according to any one of <33> to <54>, wherein the mass ratio (%) of the organic salt compound to the thermoplastic resin is preferably 0.5 or more, more preferably 2 or more, further preferably 6 or more, preferably 30 or less, more preferably 20 or less, further preferably 15 or less from the viewpoint of solubility in neutral water.

<56> The thermoplastic resin composition according to any one of <33> to <55>, wherein the ratio of the amount (mol) of an alkylsulfonic acid ion ($R^1$—$SO_3^-$) in the organic salt compound to the total amount (mol) of the sulfonic acid group and the sulfonate group in the thermoplastic resin (amount of alkylsulfonic acid ion in organic salt compound/ total amount of sulfonic acid group and sulfonate group in thermoplastic resin) is preferably 0.005 or more, more preferably 0.01 or more, further preferably 0.02 or more, further more preferably 0.03 or more, preferably 0.35 or less, more preferably 0.25 or less, further preferably 0.2 or less.

<57> The thermoplastic resin composition according to any one of <33> to <56>, wherein the proportion of the dicarboxylic acid monomer unit a, the proportion of the dicarboxylic acid monomer unit B, the proportion of the diol monomer unit, and the ratio of the organic salt compound to the total amount of all monomer units in the thermoplastic resin are preferably 10 to 30 mol %, 20 to 40 mol %, 40 to 60 mol %, and 0.05 mol % to 2 mol %.

<58> A soluble material for three-dimensional modeling comprising a thermoplastic resin composition according to any one of <33> to <57>.

<59> The soluble material for three-dimensional modeling according to <58>, wherein the glass transition temperature of the soluble material for three-dimensional modeling is more preferably 60° C. or higher, further preferably 70° C. or higher, and further more preferably 80° C. or higher, preferably 250° C. or lower, more preferably 220° C. or lower, and further preferably 200° C. or lower.

<60> The soluble material for three-dimensional modeling according to <58> or <59>, wherein the form of the soluble material for three-dimensional modeling is preferably a filament.

<61> The soluble material for three-dimensional modeling according to any one of <58> to <60>, wherein the diameter of the filament is preferably 0.5 mm or more, and more preferably 1.0 mm or more, preferably 3.0 mm or less, more preferably 2.0 mm or less, and further preferably 1.8 mm or less.

<62> A method for manufacturing a three-dimensional object by a fused deposition modeling system, the method including a step of obtaining a precursor of the three-dimensional object containing the three-dimensional object and a support material; and a support material removing step of bringing the precursor of the three-dimensional object into contact with neutral water to remove the support material, wherein a material of the support material is the soluble material for three-dimensional modeling according to any one of <58> to <61>.

<63> The method for manufacturing a three-dimensional object according to <62>, wherein the modeling material that is a material of the three-dimensional object are preferably thermoplastic resins such as an ABS resin, a PP resin, an ASA resin, a PS resin, a HIPS resin, a PVC resin, a polylactate resin, a polycarbonate resin, a polyamide resin, a polyetherimide resin, a polyetheretherketone resin, and a polyphenylsulfone resin, more preferably at least one type selected from the group consisting of an ABS resin, a polylactate resin, a polycarbonate resin, and a polyamide resin, and further preferably at least one type selected from the group consisting of an ABS resin, a polycarbonate resin, and a polyamide resin.

<64> The method for manufacturing a three-dimensional object according to <62> or <63>, wherein the glass transition temperature of the support material used in the step of obtaining precursor of three-dimensional object is preferably from (the glass transition temperature of the modeling material to be used −20° C.) to (the glass transition temperature of the modeling material to be used +20° C.), more preferably from (the glass transition temperature of the modeling material to be used −15° C.) to (the glass transition temperature of the modeling material to be used +15° C.)

<65> The method for manufacturing a three-dimensional object according to any one of <62> to <63>, wherein the method of making the precursor of the three-dimensional object contact the neutral water is preferably a method of soaking the precursor of the three-dimensional object in the neutral water.

<66> The method for manufacturing a three-dimensional object according to any one of <62> to <63>, wherein the neutral water contains a water-soluble organic solvent.

<67> The method for manufacturing a three-dimensional object according to any one of <62> to <66>, wherein the water-soluble organic solvent is preferably lower alcohols such as methanol, ethanol, and 2-propanol; glycol ethers such as propylene glycol monomethyl ether, ethylene glycol monoethyl ether, ethylene glycol mono-t-butyl ether, and diethylene glycol monobutyl ether; and ketones such as acetone, and methyl ethyl ketone.

<66> The method for manufacturing a three-dimensional object according to any one of <62> to <65>, wherein the content of the water-soluble organic solvent in the neutral water is preferably 0.1% or more by mass, more preferably 0.5% or more by mass, even more preferably 1% or more by mass, even more preferably 3% or more by mass, and is preferably 50% or less by mass, more preferably 40% or less by mass, further preferably 30% or less by mass, further more preferably 20% or less by mass.

<67> The method for manufacturing a three-dimensional object according to any one of <62> to <66>, wherein the amount of the neutral water used is preferably 10 mass times or more, and more preferably 20 mass times or more the support material, preferably 10,000 mass times or less, more preferably 5,000 mass times or less, further preferably 1,000 mass times or less, and further preferably 100 mass times or less the support material.

<66> The method for manufacturing a three-dimensional object according to any one of <62> to <65>, wherein the period over which the soluble material for three-dimensional modeling is caused to contact the neutral water is preferably 5 minutes or longer, preferably 180 minutes or shorter, more preferably 120 minutes or shorter, even more preferably 90 minutes or shorter.

<67> The method for manufacturing a three-dimensional object according to any one of <62> to <66>, wherein the washing temperature is preferably 15° C. or higher, more preferably 25° C. or higher, even more preferably 30° C. or higher, even more preferably 40° C. or higher preferably 85° C. or lower, more preferably 70° C. or lower, even more preferably 60° C. or lower.

<68> A support material that supports a three-dimensional object when manufacturing the three-dimensional object by a fused deposition modeling type 3D printer, wherein the material of the support material is the soluble material for three-dimensional modeling according to any one of <58> to <61>.

<69> Use of the thermoplastic resin composition according to any one of <33> to <57> as a soluble material for three-dimensional modeling.

Example 1

In a 2-L stainless steel separable flask (equipped with a K-tube, a stirrer, and a nitrogen introducing tube) were prepared 97.7 g of dimethyl 2,6-naphthalenedicarboxylate (manufactured by Tokyo Chemical Industry Co., Ltd., first grade), 40.6 g of sodium dimethyl 5-sulfoisophthalate (manufactured by Wako Pure Chemical Industries, Ltd.), 76.7 g of ethylene glycol (manufactured by Wako Pure Chemical Industries, Ltd., special grade), 82 mg of titanium tetrabutoxide (manufactured by Tokyo Chemical Industry Co., Ltd., first grade), and 506 mg of sodium acetate (manufactured by Wako Pure Chemical Industries, Ltd., special grade). Then, the mixture was heated by a mantle heater, with the outside temperature increased from 140° C. to 260° C. over 1 hour, under stirring at normal pressure under a nitrogen atmosphere, and was stirred at that temperature for 6.5 hours to undergo a transesterification reaction. Thereafter, 6.89 g of tetrabutylphosphonium dodecylbenzenesulfonate (manufactured by TAKEMOTO OIL & FAT Co., Ltd., trade name: ELECUT S-418) was added to the mixture and stirred for 15 minutes. Thereafter, the mixture was heated with the outside temperature increased from 260 to 290° C. over 30 minutes while the pressure was simultaneously decreased from normal pressure to 5.3 kPa, and was allowed to continuously undergo the reaction for 1 hour and a half. Then, the pressure was returned to normal pressure, and the mixture was sampled (sample P1). The mixture was allowed to undergo the reaction under stirring at 800 Pa for 30 minutes, the pressure was then returned to normal pressure, and the mixture was sampled (sample P2). The mixture was heated with the outside temperature increased from 290° C. to 295° C. at normal pressure over 15 minutes, the mixture was then allowed to undergo the reaction under stirring at 420 Pa for 15 minutes, the pressure was returned to normal pressure, and the mixture was sampled (sample P3). The mixture was allowed to undergo the reaction under stirring, with the degree of decrease in pressure gradually increased from 470 Pa to 100 Pa over 15 minutes, the pressure was returned to normal pressure, and a thermoplastic resin composition 1 was obtained (sample P4).

Comparative Example 1

A thermoplastic resin composition 2 (polyester resin) was obtained in the same manner as in Example 1 except that tetrabutylphosphonium dodecylbenzenesulfonate was not used. A sample in Comparative Example 1 corresponding to the sample P1 in Example 1 was denoted as a sample P5, a sample corresponding to the sample P2 in Example 1 was denoted as a sample P6, a sample corresponding to the sample P3 in Example 1 was denoted as a sample P7, and a sample corresponding to the sample P4 in Example 1 was denoted as a sample P8.

Example 2

In a 2-L stainless steel separable flask (equipped with a K-tube, a stirrer, and a nitrogen introducing tube) were prepared 23.7 g of dimethyl 2,6-naphthalenedicarboxylate (manufactured by Tokyo Chemical Industry Co., Ltd., first grade), 52.1 g of sodium dimethyl 5-sulfoisophthalate (manufactured by Wako Pure Chemical Industries, Ltd.), 22.4 g of ethylene glycol (manufactured by Wako Pure Chemical Industries, Ltd., special grade), 26 mg of titanium tetrabutoxide (manufactured by Tokyo Chemical Industry Co., Ltd., first grade), 117.3 g of bisphenoxyethanolfluorene (manufactured by Osaka Gas Chemicals Co., Ltd.), and 866 mg of sodium acetate (manufactured by Wako Pure Chemical Industries, Ltd., special grade). Then, the mixture was heated by a mantle heater, with the outside temperature increased from 180° C. to 260° C. over 1 hour and 10 minutes, under stirring at normal pressure under a nitrogen atmosphere, and was stirred at that temperature for 4 hours and 20 minutes to undergo a transesterification reaction. Tetrabutylphosphonium dodecylbenzenesulfonate (manufactured by TAKEMOTO OIL & FAT Co., Ltd., trade name: ELECUT S-418) in an amount of 8.80 g was added to the mixture and stirred for 45 minutes. Thereafter, the mixture was heated with the outside temperature increased from 260 to 290° C. over 1 hour and a half. Further, the mixture was heated with the outside temperature increased to 300° C. over 35 minutes while the pressure was simultaneously decreased from normal pressure to 1.3 kPa, and was allowed to undergo the reaction and then sampled (sample P9). The mixture was heated with the outside temperature increased from 305° C. to 310 over 20 minutes while the pressure was simultaneously decreased from normal pressure to 1.3 kPa, and was allowed to undergo the reaction and then sampled (sample P10). The mixture was heated with the outside temperature increased to 315° C. and then allowed to undergo the reaction under stirring, with the degree of decrease in pressure gradually increased from 1 kPa to 60 Pa over 25 minutes, and a thermoplastic resin composition 3 was obtained (sample P11).

Example 3

In a 2-L stainless steel separable flask (equipped with a K-tube, a stirrer, and a nitrogen introducing tube) were prepared 23.7 g of dimethyl 2,6-naphthalenedicarboxylate (manufactured by Tokyo Chemical Industry Co., Ltd., first grade), 52.1 g of sodium dimethyl 5-sulfoisophthalate (manufactured by Wako Pure Chemical Industries, Ltd.), 22.4 g of ethylene glycol (manufactured by Wako Pure Chemical Industries, Ltd., special grade), 26 mg of titanium tetrabutoxide (manufactured by Tokyo Chemical Industry Co., Ltd., first grade), 117.3 g of bisphenoxyethanolfluorene (manufactured by Osaka Gas Chemicals Co., Ltd.), and 866 mg of sodium acetate (manufactured by Wako Pure Chemical Industries, Ltd., special grade). Then, the mixture was heated by a mantle heater, with the outside temperature increased from 180° C. to 260° C. over 1 hour, under stirring at normal pressure under a nitrogen atmosphere, and was stirred at that temperature for 4 hours to undergo a transesterification reaction. Tetrabutylphosphonium dodecylbenzenesulfonate (manufactured by TAKEMOTO OIL & FAT Co., Ltd., trade name: ELECUT S-418) in an amount of 17.6 g was added to the mixture and stirred for 25 minutes. Thereafter, the mixture was heated with the outside temperature increased from 260° C. to 290° C. over 1 hour and 5 minutes, and was stirred for 10 minutes. Further, the mixture was heated with the outside temperature increased to 300° C. over 35 minutes while the pressure was simultaneously decreased from normal pressure to 1.3 kPa, and was allowed to undergo the reaction and then sampled (sample P12). The mixture was heated with the outside temperature increased from 305° C. to 310 over 20 minutes while the pressure was simultaneously decreased from normal pressure to 1.3 kPa, and was allowed to undergo the reaction and then sampled (sample P13). The mixture was heated with the outside temperature increased to 315° C., was then allowed to undergo the reaction under stirring, with the degree of decrease in pressure gradually increased from 1.4 kPa to 140 Pa over 25 minutes, and was then sampled (sample P14). Further, the mixture was allowed to undergo the reaction at 315° C. and 76 Pa for 25 minutes, and a thermoplastic resin composition 4 was obtained (sample P15).

Comparative Example 2

A thermoplastic resin composition 5 (polyester resin) was obtained in the same manner as in Example 2 except that tetrabutylphosphonium dodecylbenzenesulfonate was not used. A sample in Comparative Example 2 corresponding to the sample P9 in Example 2 was denoted as a sample P16, a sample corresponding to the sample P10 in Example 2 was denoted as a sample P17, and a sample corresponding to the sample P11 in Example 2 was denoted as a sample P18.

Table 1 shows the preparation ratio of the raw materials in each of Examples 1, 2, and 3 and Comparative Examples 1 and 2. In Table 1, NPDM (mole ratio) represents the ratio (mole ratio) of dimethyl 2,6-naphthalenedicarboxylate in the raw materials of the thermoplastic resin, SID (mole ratio) represents the ratio (mole ratio) of sodium dimethyl 5-sulfoisophthalate in the raw materials of the thermoplastic resin, EG (mole ratio) represents the ratio (mole ratio) of ethylene glycol in the raw materials of the thermoplastic resin, and BPEF (mole ratio) represents the ratio (mole ratio) of bisphenoxyethanolfluorene in the raw materials of the thermoplastic resin.

[Analysis of Thermoplastic Resin Composition]
[Constitution of Thermoplastic Resin Composition]

The constitution of the polyester resin contained in the thermoplastic resin composition 1 can be determined by proton NMR measurement using NMR MR400 manufactured by Agilent technologies.

[Amount of Hydrophilic Group in Thermoplastic Resin]

The amount (unit: mmol/g) of a hydrophilic group ($SO_3$) in the thermoplastic resin composition 1 can be determined from the constitution of the thermoplastic resin composition 1 determined by the above method.

[Weight Average Molecular Weight (Mw) of Polyester Resin]

The weight average molecular weight (Mw) of each of the samples P1 to P18 was measured by a gel permeation chromatography (GPC). A polystyrene standard was used to make a calibration curve and the following conditions were used in the analysis.

(Measurement Conditions)
Equipment: HLC-8320GPC (manufactured by TOSOH Corporation, detector integrated)
Column: α-M×2 columns (manufactured by TOSOH Corporation, 7.8 mm I.D.×30 cm)
Eluent: 60 mmol/L phosphoric acid+50 mmol/L lithium bromide dimethylformamide solution
Flow rate: 1.0 mL/min
Column temperature: 40° C.
Detector: RI detector
Standard: Polystyrene

[Glass Transition Temperature]

The sample sandwiched between polyimide films was placed on a hot plate heated at 260° C. and pressed from above with a spatula to make a sheet having a thickness of about 0.2 mm. A 5 to 10 mg sample was cut out from this sheet with scissors, precisely weighed, and sealed in an aluminum pan. Using a DSC apparatus (DSC7020 manufactured by Seiko Instruments Inc.), the temperature of the aluminum pan with the sample was increased from 30° C. to 250° C. at 10° C./min and the heated aluminum pan with the sample was then rapidly cooled to 30° C. The temperature of the aluminum pan with the sample was increased again to 250° C. at 10° C./min, and a DSC curve was obtained. The glass transition temperature (° C.) of each of the samples P1 to P18 was determined from the DSC curve.

TABLE 1

| Preparation ratio of raw materials | Example 1 | Comparative Example 1 | Example 2 | Example 3 | Comparative Example 2 |
|---|---|---|---|---|---|
| NPDM (mole ratio) | 37.25 | 37.25 | 17.75 | 17.75 | 17.75 |
| SID (mole ratio) | 12.75 | 12.75 | 32.25 | 32.25 | 32.25 |
| EG (mole ratio) | 115 | 115 | 2.3 | 2.3 | 2.3 |
| BPEF (mole ratio) | — | — | 112.7 | 112.7 | 112.7 |
| Organic salt compound (mole ratio to total of sulfonic acid group and sulfonate group in thermoplastic resin) | 0.086 | 0 | 0.085 | 0.171 | 0 |

<Evaluation Method>
[Power Consumption by Stirrer During Polyesterification Reaction]

The power consumption by a stirrer in Example 1 and Comparative Example 1 was monitored over time using power consumption measuring apparatus TAP-TST8 manufactured by Sanwa Supply Inc.

[Control of Weight Average Molecular Weight]

FIG. 1 is a graph on which are plotted results of power consumption by a stirrer measured over time by the above method during the polyesterification reaction and measured values of the weight average molecular weight of the samples P1 to P8. FIG. 1 clarifies that the manufacture of the samples with the organic salt compound added to the reaction system facilitated control of the weight average molecular weight compared to the cases where no organic salt compound was used.

[Dissolution Rate]

The samples P1 to P3 and P5 to P7 were each sandwiched with polyimide films and crushed with a hammer to prepare evaluation samples. The samples P4, P8, P11, P15, and P18 were crushed (crushing time was 120 seconds) with a coffee mill (Mini Blender manufactured by OSAKA CHEMICAL Co., Ltd.) to prepare evaluation samples. The sample powder in an amount of 0.25 g was dispersed in 5 g of 70° C. ion exchanged water in a 50-mL screw cap tube, left to stand still for 5 minutes, then softly shaken for redispersion of the polymer powder, and further left to stand still at 70° C. for 5 minutes. The polymer that remained undissolved was filtrated under reduced pressure (paper filter No. 5C/70 mm manufactured by ADVANTEC) and dried. The dry mass of the polymer that remained undissolved was measured, and the dissolution rate was calculated by a following equation. Table 1 shows evaluation results.

Dissolution rate (%)=(mass of polymer before dissolution−mass of polymer remaining undissolved)/mass of polymer before dissolution×100

The samples P4 and P8 were also evaluated with an aqueous 2% solution of BDG (diethylene glycol mono-n-butyl ether). Further, P11, P15, and P18 were also evaluated with an aqueous 2% solution of BDG and an aqueous 2% solution of BzDG (diethylene glycol monobenzyl ether). Tables 2 and 3 clarifies that the samples manufactured by adding the organic salt compound to the reaction system were improved in dissolution speed in neutral water compared to the samples that were manufactured using no organic salt compound and had an equal molecular weight.

[Hue]

Solidified samples P1 to P8 in an amount of 3 to 6 g and samples P11, P15, and P18 in an amount of 6 to 11 g were put in clear and colorless 50-mL screw cap tubes and observed for the hue in a solid state by visual inspection. FIGS. 2 to 4 show photographs of the samples. FIG. 2 shows the sample P1 denoted by 1, the sample P2 by 2, the sample P3 by 3, and the sample P4 by 4. FIG. 3 shows the sample P5 denoted by 5, the sample P6 by 6, the sample P7 by 7, and the sample P8 by 8. FIG. 4. shows the sample P11 denoted by 11, the sample P15 by 15, and the sample P18 by 18. Comparing a change of color from 1 to 4 in FIG. 2 with a change of color from 5 to 8 in FIG. 3 and comparing the hues of 11 and 15 with the hue of 18 in FIG. 4 clarify that coloring was suppressed in Example 1, in which tetrabutylphosphonium dodecylbenzenesulfonate as the organic salt compound was added, compared to in Comparative Example 1.

Tables 2 and 3 show evaluation results of Examples 1 to 3 and Comparative Examples 1 and 2.

TABLE 2

| | | Example 1 | | | | Comparative Example 1 | | |
|---|---|---|---|---|---|---|---|---|
| Sample number | P1 | P2 | P3 | P4 | P5 | P6 | P7 | P8 |
| Hue | Pale yellow | Yellow | Yellow | Yellow to yellowish brown | Pale yellow | Pale brown | Yellowish brown | Blackish brown |
| Weight average molecular weight (Mw) | 17000 | 29000 | 33000 | 39000 | 16000 | 24000 | 28000 | 29000 |
| Dissolution rate (%) Water | 98 | 98 | 88 | 28 | 98 | 26 | 26 | 13 |
| Dissolution rate (%) Aqueous 2% solution of BDG | | | | 98 | | | | 35 |
| Glass transition temperature (° C.) | 101 | 109 | 108 | 109 | 107 | 111 | 114 | 113 |
| Note | The sample has a very high dissolution rate in water and a slightly low weight average molecular weight, so that the sample is rather unsuitable as the soluble material for three-dimensional modeling. | The sample has a very high dissolution rate in water and a high weight average molecular weight, so that the sample is suitable as the soluble material for three-dimensional modeling. | The sample has a high very dissolution rate in water and a high weight average molecular weight, so that the sample is suitable as the soluble material for three-dimensional modeling. | The sample has a low dissoultion rate in water but has a very high dissolution rate in the aqueous BDG solution, and has a very high weight average molecular weight, so that the sample is suitable as the soluble material for three-dimensional modeling. | The sample has a very high dissolution rate in water and a low weight average molecular weight, so that the sample is unsuitable as the soluble material for three-dimensional modeling. | The sample has a low dissolution rate in water and a high weight average molecular weight, so that the sample is unsuitable as the soluble material for three-dimensional modeling. | The sample has a low dissolution rate in water and a high weight average molecular weight, so that the sample is unsuitable as the soluble material for three-dimensional modeling. | The sample has a low dissolution rate in water and a slightly low dissolution rate in the aqueous BDG soultion, has a high weight average molecular weight, and is colored in blackish brown, so that the sample is unsuitable as the soluble material for three-dimensional modeling. |

TABLE 3

|  |  | Example 2 | | | Example 3 | | | | Comparative Example 2 | | |
|---|---|---|---|---|---|---|---|---|---|---|---|
| Sample number | | P9 | P10 | P11 | P12 | P13 | P14 | P15 | P16 | P17 | P18 |
| Hue | | | | Yellow | | | | Yellowish brown | | | Blackish brown |
| Weight average molecular weight (Mw) | | 10000 | 12000 | 16000 | 12000 | 15000 | 21000 | 25000 | 7000 | 11000 | 13500 |
| Dissolution rate (%) | Water | | | 11 | | | | 8 | | | 6 |
| | Aqueous 2% solution of BDG | | | 43 | | | | 13 | | | 41 |
| | Aqueous 2% solution of BzDG | | | 100 | | | | 98 | | | 84 |
| Glass transition temperature (° C.) | | 180 | 188 | 199 | 173 | 181 | 187 | 190 | 189 | 202 | 203 |
| Note | | The sample has a slightly low weight average molecular weight, so that the sample is rather unsuitable as the soluble material for three-dimensional modeling. | The sample has a slightly low weight average molecular weight, so that the sample is rather unsuitable as the soluble material for three-dimensional modeling. | The sample has a very high dissolution rate in the aqueous BzDG solution and a high weight average molecular weight, so that the sample is suitable as the soluble material for three-dimensional modeling. | The sample has a slightly low weight average molecular weight, so that the sample is rather unsuitable as the soluble material for three-dimensional modeling. | The sample has a high weight average molecular weight, so that the sample is rather unsuitable as the soluble material for three-dimensional modeling. | The sample has a very high weight average molecular weight, so that the sample is suitable as the soluble material for three-dimensional modeling. | The sample has a very high dissolution rate in the aqueous BzDG solution and a very high weight average molecular weight, so that the sample is suitable as the soluble material for three-dimensional modeling. | The sample has a low weight average molecular weight, so that the sample is unsuitable as the soluble material for three-dimensional modeling. | The sample has a slightly low weight average molecular weight, so that the sample is rather unsuitable as the soluble material for three-dimensional modeling. | The sample has a high dissolution rate in the aqueous BzDG solution and a slightly low weight average molecular weight, so that the sample is rather unsuitable as the soluble material for three-dimensional modeling. |

Example 4

The thermoplastic resin composition 1 of Example 1 was extruded from a capillary of a capilograph (Capilograph 1D manufactured by Toyo Seiki Seisaku-sho, Ltd.) at a melt temperature of 180° C. and an extrusion speed of 10 ram/min, with the capillary having a diameter of 2 mm and a length of 10 mm. The extruded product was processed into a filament having a diameter of 1.5 mm by manually and lightly pulling a tip of the extruded product with tweezers. Thereafter, the filament was supplied to Atom 3D printer manufactured by Genkei. LLC. and extruded from a heated nozzle at 230° C. The filament could be discharged without clogging the nozzle, and the melted product was confirmed to be solidified immediately. This clarifies that the thermoplastic resin 1 is usable as the soluble material for three-dimensional modeling that is a material of the support material.

Synthesis of Thermoplastic Resin 1

Synthesis Example 1

In a 2-L stainless steel separable flask (equipped with a K-tube, a stirrer, and a nitrogen introducing tube) were prepared 97.7 g of dimethyl 2,6-naphthalenedicarboxylate (manufactured by Tokyo Chemical Industry Co., Ltd., first grade), 40.6 g of sodium dimethyl 5-sulfoisophthalate (manufactured by Wako Pure Chemical Industries, Ltd.), 76.7 g of ethylene glycol (manufactured by Wako Pure Chemical Industries, Ltd., special grade), 82 mg of titanium tetrabutoxide (manufactured by Tokyo Chemical Industry Co., Ltd., first grade), and 506 mg of sodium acetate (manufactured by Wako Pure Chemical Industries, Ltd., special grade). Then, the mixture was heated by a mantle heater, with the outside temperature increased from 140° C. to 260° C. over 1 hour, under stirring at normal pressure under a nitrogen atmosphere, and was stirred at that temperature for 6.5 hours to undergo a transesterification reaction. Thereafter, the mixture was heated with the outside temperature increased from 260 to 290° C. over 30 minutes while the pressure was simultaneously decreased from normal pressure to 5.3 kPa, and was allowed to continuously undergo the reaction for 1 hour and a half. Subsequently, the mixture was allowed to undergo the reaction under stirring at 800 Pa for 30 minutes. Next, the mixture was heated with the outside temperature increased from 290° C. to 295° C. at normal pressure over 15 minutes, the mixture was then allowed to undergo the reaction under stirring at 420 Pa for 15 minutes. Further, the mixture was allowed to undergo the reaction under stirring, with the degree of decrease in pressure gradually increased from 470 Pa to 100 Pa over 15 minutes, the pressure was returned to normal pressure, and a thermoplastic resin 1 was obtained. The weight average molecular weight of the thermoplastic resin 1 was 17800, and the glass transition temperature of the thermoplastic resin 1 was 110° C.

Synthesis of Soluble Materials 1 to 4

Example 5

The thermoplastic resin 1 obtained in Synthesis Example 1 in an amount of 98.7 g and 0.98 g of ELECUT S-418 (manufactured by TAKEMOTO OIL & FAT Co., Ltd.: organic salt compound: tetrabutylphosphonium dodecylbenzenesulfonate) were dried at 60° C. under reduced pressure and were then melt-kneaded with a melt kneader (manufactured by Toyo Seiki Seisaku-sho, Ltd.: Labo Plastmill 4C150) at 230° C. and 90 r/min for 10 minutes to give a yellow mixture as a soluble material 1. A viscosity reduction effect was evaluated with a value of kneading torque after 5 minutes of the kneading. Table 4 shows a result. The mole ratio of the organic salt compound to the sulfonic acid group in the thermoplastic resin was 0.0172.

Examples 6 and 7

Yellow mixtures as soluble materials 2 and 3 were obtained in the same manner as in Example 5 except that the yellow mixture as a soluble material 4. A viscosity reduction effect was evaluated with a value of kneading torque after 5 minutes of the kneading. Table 4 shows a result.

[Manufacture of Filament]

Sample pieces obtained by finely crushing each of the soluble materials 1 to 4 were extruded from a capillary of a capilograph (manufactured by Toyo Seiki Seisaku-sho, Ltd.: Capilograph 1D) at a melt temperature of 210° C. and an extrusion speed of 10 ram/min, with the capillary having a diameter of 2.0 mm and a length of 10 mm. The extruded product was processed into a filament having a diameter of 2.1 mm by manually and lightly pulling a tip of the extruded product with tweezers.

<Analysis of Filament>

[Glass Transition Temperature]

The glass transition temperature was determined in the same manner as in the method for analyzing the glass transition temperature of the thermoplastic resin composition. Table 4 shows evaluation results.

[Dissolution Time of Filament]

Water in an amount of 1 L was charged into a beaker having a volume of 1 L and heated to 70° C. by a heater under stirring with a magnetic stirrer at 300 rpm. The resin filament (diameter: about 2.1 mm, length 13 cm) formed by the capilograph was hung from above and immersed in the water, and a time required for the filament to be dissolved and cut was measured. Table 4 shows evaluation results.

TABLE 4

| | | | Organic salt compound | | | | | |
| | | Thermoplastic resin 1 Preparation amount [g] | Preparation amount [g] | Amount relative to 100 parts by mass of thermoplastic resin [part by mass] | Mole ratio to total of sulfonic acid group and sulfonate group in thermoplastic resin | Kneading torque [N · m] | Glass transition temperature of soluble material [° C.] | Resin melt temperature during formation of filament [° C.] | Dissolution time of filament |
|---|---|---|---|---|---|---|---|---|---|
| Example 5 | Soluble material 1 | 98.7 | 0.98 | 1 | 0.0172 | 18 | 109 | 200 | 4 min 28 s |
| Example 6 | Soluble material 2 | 97.1 | 2.91 | 3 | 0.0516 | 15 | 108 | 190 | 3 min 40 s |
| Example 7 | Soluble material 3 | 94.7 | 4.73 | 5 | 0.086 | 13 | 107 | 180 | 2 min 28 s |
| Comparative Example 3 | Soluble material 4 | 100 | 0 | 0 | 0 | 30 | 110 | 210 | 5 min 12 s | usage amounts of the thermoplastic resin 1 obtained in Synthesis Example 1 and ELECUT S-418 (manufactured by TAKEMOTO OIL & FAT Co., Ltd.: organic salt compound: tetrabutylphosphonium dodecylbenzenesulfonate) were changed as shown in Table 4. A viscosity reduction effect was evaluated with a value of kneading torque after 5 minutes of the kneading. Table 4 shows a result. The mole ratio of the organic salt compound to the sulfonic acid group in the thermoplastic resin was 0.0516 in Example 6 and 0.086 in Example 7.

Comparative Example 3

The thermoplastic resin 1 obtained in Synthesis Example 1 in an amount of 100 g was dried at 60° C. under reduced pressure and then melt-kneaded with a melt kneader (manufactured by Toyo Seiki Seisaku-sho, Ltd.: Labo Plastmill 4C150) at 230° C. and 90 r/min for 10 minutes to give a

The invention claimed is:

1. A method for manufacturing a thermoplastic resin composition comprising a thermoplastic resin, the method comprising:
   mixing an organic salt compound during preparation of the thermoplastic resin;
   wherein:
   the thermoplastic resin comprises dicarboxylic acid monomer units derived from at least one dicarboxylic acid component;
   the dicarboxylic acid monomer units comprise aromatic dicarboxylic acid monomer units derived from at least one selected from the group consisting of a sulfonic acid group-containing aromatic dicarboxylic acid component and a sulfonate group-containing aromatic dicarboxylic acid component;
   the thermoplastic resin comprises the aromatic dicarboxylic acid monomer units in an amount of 10 mol % or more based on a total amount of the dicarboxylic acid monomer units in the thermoplastic resin;

the thermoplastic resin comprises the aromatic dicarboxylic acid monomer units in an amount of 8 to 45 mol % based on a total amount of monomer units in the thermoplastic resin;

the thermoplastic resin has a weight average molecular weight ($M_w$) of 16,000 to 35,000; and the organic salt compound comprises a compound according to formula (I):

$$(R^1-SO_3^-)_n X^{n+} \quad (I)$$

wherein:
R$^1$ represents a hydrocarbon group that may have a substituent and has 1 to 30 carbon atoms;
n represents a number of 1 or 2;
when n is 1, $X^{n+}$ represents a sodium ion, a potassium ion, a lithium ion, an ammonium ion, or a phosphonium ion; and
when n is 2, $X^{n+}$ represents a magnesium ion, a calcium ion, a barium ion, or a zinc ion.

2. The method for manufacturing a thermoplastic resin composition according to claim 1, wherein the mixing comprises adding the organic salt compound at a mole ratio of 0.005 or more relative to a total amount of the aromatic dicarboxylic acid monomer units in the thermoplastic resin.

3. The method for manufacturing a thermoplastic resin composition according to claim 1, wherein the dicarboxylic acid monomer units comprise non-hydrophilic dicarboxylic acid monomer units derived from at least one non-hydrophilic group-containing dicarboxylic acid component in an amount of 5 to 45 mol % based on the total amount of monomer units in the thermoplastic resin.

4. The method for manufacturing a thermoplastic resin composition according to claim 1, wherein the mixing comprises adding the organic salt compound during polymerization to form the thermoplastic resin.

5. The method for manufacturing a thermoplastic resin composition according to claim 1, wherein the thermoplastic resin comprises at least one selected frog the group consisting of sulfonic acid groups and sulfonate groups in a total amount of 0.5 mmol/g or more and 3.0 mmol/g or less.

6. The method for manufacturing a thermoplastic resin composition according to claim 1, wherein the thermoplastic resin is a polyester resin or a polyamide resin.

7. The method for manufacturing a thermoplastic resin composition according to claim 6, the mixing comprises mixing the organic salt compound with the at least one dicarboxylic acid component and at least one selected from the group consisting of a diol component and a diamine component.

8. The method for manufacturing a thermoplastic resin composition according to claim 1, wherein:
$X^{n+}$ represents a phosphonium ion; and
the phosphonium ion is a tetraalkylphosphonium ion.

9. The method for manufacturing a thermoplastic resin composition according to claim 1, wherein the mixing comprises adding the organic salt compound at a mass ratio of 0.5 to 30% relative to a mass of the thermoplastic resin.

10. The method for manufacturing a thermoplastic resin composition according to claim 1, wherein the mixing comprises adding the organic salt compound in an amount such that a molar ratio of alkylsulfonic acid ions ($R^1-SO_3^-$) in the organic salt compound to hydrophilic groups in the thermoplastic resin is 0.005 to 1.0.

11. A soluble material for three-dimensional modeling comprising a thermoplastic resin composition obtained by the method for manufacturing a thermoplastic resin composition according to claim 1.

12. A method for manufacturing a three-dimensional object by a fused deposition modeling system, the method comprising:
obtaining a precursor of the three-dimensional object comprising the three-dimensional object and a support material; and
removing the support material by bringing the precursor of the three-dimensional object into contact with neutral water;
wherein the support material comprises the soluble material for three-dimensional modeling according to claim 11.

* * * * *